United States Patent [19]
Fournier et al.

[11] Patent Number: 5,647,328
[45] Date of Patent: Jul. 15, 1997

[54] IN-TANK FUEL PUMP AND RESERVOIR

[75] Inventors: Kirk D. Fournier; Wayne T. Lipinski, both of Essexville; Charles H. Tuckey, Cass City, all of Mich.

[73] Assignee: Walbro Corporation, Cass City, Mich.

[21] Appl. No.: 602,087

[22] Filed: Feb. 15, 1996

Related U.S. Application Data

[63] Continuation-in-part of Ser. No. 587,852, Jan. 11, 1996, abandoned, which is a continuation-in-part of Ser. No. 496,950, Jun. 30, 1995, abandoned.

[51] Int. Cl.$^6$ .................................................. F02M 37/04
[52] U.S. Cl. ............................................ 123/509; 137/574
[58] Field of Search ............................ 123/509, 514; 137/574, 576, 587

[56] References Cited

U.S. PATENT DOCUMENTS

| | | |
|---|---|---|
| 4,546,750 | 10/1985 | Brunell et al. . |
| 4,697,995 | 10/1987 | Tuckey ......................... 418/15 |
| 4,757,388 | 7/1988 | Tuckey . |
| 4,807,582 | 2/1989 | Tuckey . |
| 4,831,990 | 5/1989 | Tuckey . |
| 4,869,225 | 9/1989 | Nagata et al. . |
| 4,893,647 | 1/1990 | Tuckey . |
| 4,919,103 | 4/1990 | Ishiguro et al. ................ 123/509 |
| 4,964,787 | 10/1990 | Hoover ........................... 417/363 |
| 5,170,764 | 12/1992 | Tuckey ........................... 123/509 |
| 5,220,941 | 6/1993 | Tuckey ........................... 137/510 |
| 5,237,977 | 8/1993 | Tuckey . |
| 5,257,916 | 11/1993 | Tuckey ......................... 417/423.1 |
| 5,289,810 | 3/1994 | Bauer et al. . |
| 5,341,842 | 8/1994 | Chih et al. . |
| 5,398,655 | 3/1995 | Tuckey ........................... 123/456 |
| 5,415,146 | 5/1995 | Tuckey ........................... 123/509 |
| 5,431,143 | 7/1995 | Brown ............................ 137/576 |

*Primary Examiner*—Thomas N. Moulis
*Attorney, Agent, or Firm*—Barnes, Kisselle, Raisch, Choate, Whittemore & Hulbert

[57] ABSTRACT

An engine fuel delivery system and method, and for use therein, an in-tank fuel pump and reservoir canister module assembly having a primary fuel filter mounted in a base subassembly adjacent the bottom of the tank and defining a filter chamber in the base having an outlet connected to the inlet of an electric fuel pump received directly in the tank exteriorly alongside of an upright open top reserve fuel canister. The pump outlet is connected to a bypass pressure regulator which discharges fuel in excess of engine demand into the canister. The canister has a bottom outlet mounted on the base subassembly and closed by a flow controlling valve and/or by a restricted orifice communicating the canister outlet with the filter chamber for returning bypassed reserve fuel from the canister reservoir to the pump inlet, either continuously and/or when a low level supply of fuel in the tank to the primary filter is interrupted, such as during cornering or going up or down a steep hill or incline. The valve is formed integrally on or mounted in contact with a secondary filter diaphragm base mounted between the canister outlet and filter chamber and also communicating with the tank. The valve opens with canister outflow downwardly against the bias of a coil spring in response to pump suction acting on a capillary seal formed on the diaphragm filter material to thereby allow reserve fuel to wash over and flow through it into the filter chamber. At system shut-down a filter backwash flow can occur from the canister reservoir.

39 Claims, 11 Drawing Sheets

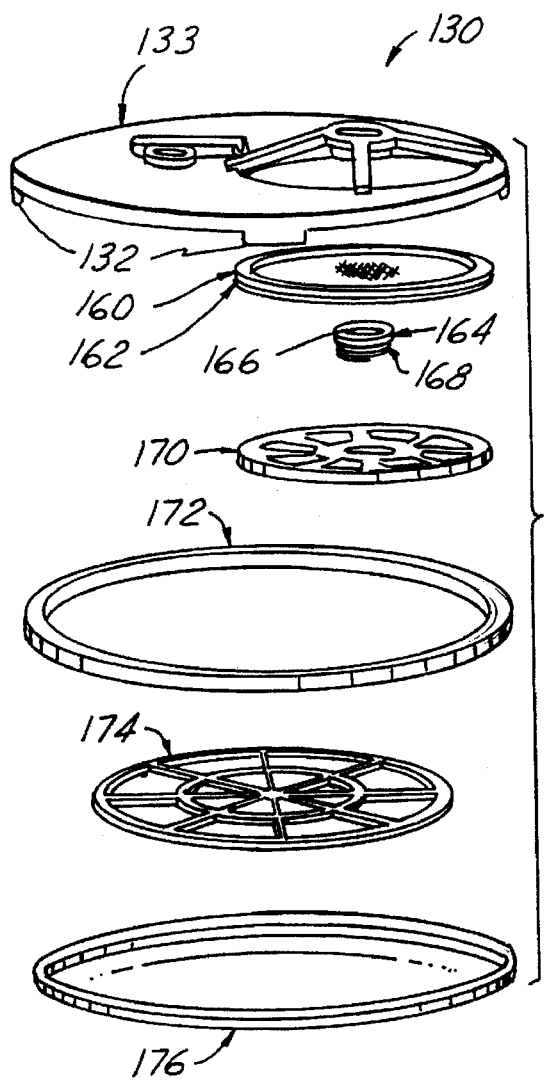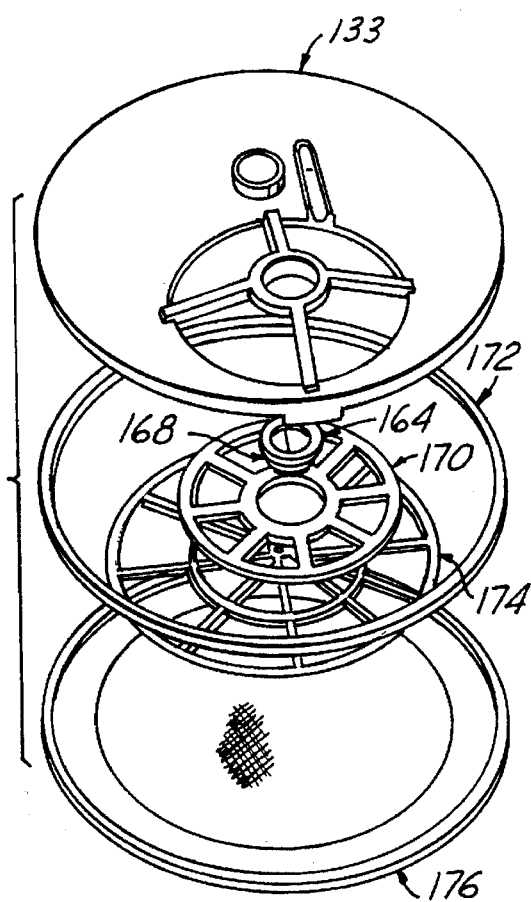
FIG.11
FIG.12

IN-TANK FUEL PUMP AND RESERVOIR

CO-PENDENCY APPLICATIONS

This application is a continuation-in-part of application Ser. No. 08/587,852, filed Jan. 11, 1996, abandoned, which is a continuation-in-part of application Ser. No. 08/496,950, filed Jun. 30, 1995, now abandoned.

FIELD OF THE INVENTION

This invention relates to vehicle fuel systems and more particularly to an electric fuel pump and reservoir disposed in a main fuel tank of a vehicle.

BACKGROUND OF THE INVENTION

Modern fuel delivery systems for automotive vehicles with engines having fuel injectors have utilized an electrically driven fuel pump in the vehicle main fuel tank. Typically, the electric fuel pump is mounted either directly in the vehicle tank, or is mounted within a reservoir canister received in the tank as shown for example in U.S. Pat. Nos. 4,747,388; 4,807,582; 4,831,990; 4,893,647; and 4,964,787. The canister reservoir supplies fuel to the pump in the event there is an interruption in the availability of fuel from the tank, such as when, under low fuel level conditions, cornering of the vehicle causes sloshing or movement of the fuel away from the pump inlet and to one side or the other of the tank, and/or when the tank is excessively tilted by vehicle inclination on severe grades, or when essentially all of the fuel in the main tank has been consumed or used. Typically, the output of the fuel pump is greater than that required by the vehicle engine and the excess fuel is either returned from the fuel injectors to the tank or to the in-tank canister reservoir.

Typically, in a no-return fuel system, there is only one fuel supply line between the fuel pump module and an engine fuel rail or manifold distributing fuel to the individual fuel injectors, and downstream of the fuel injectors there is no line returning unused fuel from the rail or manifold to the fuel tank. In such non-return fuel systems excess fuel is bypassed directly to the tank or canister reservoir, typically by a pressure regulator usually located closely downstream of the pump outlet within the tank or canister, or by a return line to the tank or canister when the regulator is exteriorly remote from the tank.

In the aforementioned fuel systems in which the fuel pump is mounted in a fuel canister special valving has been provided between the canister, reservoir and the pump inlet to supply reserve fuel when the main tank supply is low; see for example the above cited U.S. Pat. No. 4,747,388. In this system, a valve actuated by pump suction lift of the primary fuel filter opens to provide fuel from the canister reservoir to the pump inlet when the pump inlet is starved because of low fuel or because of movement of fuel in the main tank to one side or the other during vehicle negotiation of a curve in the road. Further examples of use of a reservoir canister and special valving for supplying reserve fuel to a fuel pump are disclosed in U.S. Pat. Nos. 4,546,750 and 5,237,977. In these systems, under conditions of low fuel in the main fuel tank a valve associated with the canister responds to inertial forces created by side swerving motion of the vehicle, and/or in response to gravitational forces caused by excessive tilting of the vehicle on hills and grades, to open and allow flow of fuel from the canister to the fuel flow passage leading to the pump to thereby prevent starving of the engine due to no or low pump inflow from the main fuel tank.

Another system in accordance with the present invention for preventing starving of the fuel pump and hence the engine due to low flow from the main tank is that set forth in co-pending benefit parent application Ser. No. 08/496,950, filed Jun. 30, 1995 in the name of Charles H. Tuckey and assigned to Walbro Corporation, which is incorporated herein by reference. In this system a fuel pump is mounted directly in the tank and an in-tank standpipe reservoir is also mounted in the tank alongside of the pump and receives bypass fuel from the pump. A restricted orifice provides the standpipe outlet and feeds into the space above the filter media of the primary fuel filter to thereby provide an always-open reserve fuel flow path from the standpipe reservoir to the fuel pump inlet. The orifice is calibrated to be balanced with pump draw to prevent standpipe overflow so most if not all bypass fuel is returned to the pump inlet rather than overflowing to the main tank. This system also enables the reservoir fuel at pump shut down to gravity flow back into the main tank from the interior of the main filter under low tank fuel level conditions to thereby backflush contaminants from the exterior surface of the main filter.

Generally speaking two types of electrically driven rotary fuel pumps have hitherto been used in the vehicle main fuel tank for pumping liquid fuels to the fuel injectors of the automotive vehicle engine, namely a turbine type vane pump or a positive displacement pump. One preferred form of a positive displacement gear rotor type electric fuel pump is disclosed in U.S. Pat. No. 4,697,995, and a suitable turbine regenerative fuel pump is disclosed in U.S. Pat. No. 5,257,916, the disclosures of which are incorporated herein by reference.

In-tank vehicle fuel pumps must be capable of operating in a wide range of ambient temperatures. The hydrocarbon fuels (gasoline and alcohol) have a relatively low boiling point. In certain geographical areas, the ambient temperatures may reach 110° to 120° Fahrenheit. The temperature in the fuel tank below the automotive vehicle may be even higher than this. Since these pumps are frequently mounted in the fuel tanks, there is a great likelihood that the fuel in the pump may vaporize. The pumps when mounted in reservoir canisters are usually positive displacement pumps and it is necessary that the entry to the pump chambers create a low pressure to draw fuel into the pumping chambers. This reduced pressure alone may cause a change in state of the fuel from liquid to vapor at elevated temperatures and significantly reduce the efficiency of the pump.

In another condition as, for example, when a vehicle has been operating and then the engine shut off for a period, the fuel line between the pump and fuel injectors full of liquid fuel under pressure whereas the fuel in the pump can be completely vaporized due to the elevated temperature in the fuel tank and pump itself. Thus, when the engine is restarted, the pump is full of vapor and even the fuel in the entrance filter may be vaporized. The pump cannot, under these conditions, generate enough pressure to move the fuel in the pressurized fuel supply line.

Accordingly, both of the aforementioned U.S. Pat. Nos. 4,697,995 and 5,257,916 patents disclose a rotary pump construction with a built-in vapor purging system which will enable the pump to operate under the conditions above described without interruption of the fuel supply, with one major exception. In accordance with the present invention it has been found that turbine vane pump when disposed within an in-tank canister reservoir does not operate satisfactorily to sufficiently purge itself of vapor under adverse temperature or other vapor-inducing conditions. Due to the preferred location and size of the vapor purge port in the first or pre-channel zone and the inherent operating characteristics of the turbine pump, only a small amount of vapor pressure build up can be produced by such a pump at the pump vapor purge port. Hence, unlike the positive displacement pumps employed within the in-tank canister reservoirs as described previously, it has been found that such a vane type pump cannot purge itself of vapor in the pumping channel if the pressure differential between the pump inlet and the vapor port outlet exceeds about 2½ inches of water.

This constraint as to self-purging of vapor does not apply to positive displacement gear rotor pumps of the aforementioned type since they characteristically pump both fuel vapor and air very well. Hence, when mounted inside an in-tank fuel reservoir canister and provided with a vapor purging port communicating with the column of fuel in the canister and located at approximately the elevation of the rotary pump chamber, such positive displacement pumps can purge vapor into the canister against a gravity fuel differential pressure head ranging from say six on up to ten or twelve inches, as when the canister reservoir is full and the gravity head at the pump inlet exerted by the body of fuel in the tank exterior to the canister reservoir is very low.

Nevertheless, some OEM automotive vehicle manufacturers have preferred turbine vane fuel pumps for use in fuel tanks over gear rotor positive displacement pumps for a variety of reasons, even though they have had to forsake the advantages of a canister reservoir-type reserve supply of fuel for preventing starvation of fuel supply to the turbine pump from the main tank in order to obtain vapor self-purging operation. In an attempt to make up for this lack of the preferred selectable alternative canister reserve supply of fuel, such as that provided in the aforementioned U.S. Pat. No. 4,747,388, some automotive manufacturers have mounted turbine vane fuel pumps in specially configured fuel tanks with the pump inlet submerged in a so-called "swirl pot", i.e., a molded-in basin in the tank bottom in an attempt to maintain an adequate body of fuel in the vicinity of the fuel pump inlet to prevent pump starvation. However such swirl pots are still subject to being emptied by severe vehicle cornering or excessive vehicle inclination, as well as when essentially all of the fuel of the main tank has been consumed or used. Such swirl pots also inherently must be limited in their length, width and depth dimensions, thereby imposing a further constraint on the bulk of the fuel pump and associated filter package which can be accommodated in such swirl pots.

Despite such hitherto prevailing limitations, some OEM automotive vehicle manufacturers have preferred to use turbine vane-type fuel pumps over gear rotor positive displacement pumps for in-tank mounting because such turbine vane pumps generally are quieter and smoother running, and also have low tank fuel level operation performance characteristics preferred by such vehicle manufacturers over those of gear rotor positive displacement pumps. With a typical positive displacement gear rotor fuel pump, such as that disclosed in the aforementioned U.S. Pat. No. 5,257,916, when the pump encounters like conditions with a large presence of vapor in the pump chamber, the positive displacement pump will continue to pump liquid fuel but will also pump vapor as well. When this condition occurs the fuel pumped to the engine contains vapor and/or air entrained with liquid fuel. This will cause the vehicle engine to spit and stumble or otherwise run rough even though the engine continues to run on this vapor and liquid fuel mixture. However, because of constraints imposed by engine control unit (ECU) operational characteristics and exhaust emission requirements, several vehicle manufacturers would prefer to see the instantaneous shut off characteristic under extreme low tank fuel level conditions of the turbine vane fuel pump, wherein the pump ceases pumping any fuel.

OBJECTS OF THE INVENTION

Accordingly an object of the present invention is to provide an in-tank fuel delivery system, method and module which solves the aforementioned problem of the existing trade-off hitherto required between utilizing a positive displacement pump housed in a reservoir canister, and thereby provided with an ample supply of reserve fuel under all tank fuel level conditions, versus a turbine vane type fuel pump having preferred performance characteristics and operable vapor purging system but lacking an adequate and selectable reserve body of fuel to prevent pump starvation under adverse tank fuel level conditions.

A further object of the invention is to provide a fuel delivery in-tank, system, method and module of the aforementioned character embodying both an in-tank fuel pump and a canister reservoir of the "bottom seeking type" which can be made in a compact subassembly small enough to fit within the existing confines of a fuel tank swirl pot and in which the fuel pump inlet can selectively draw from the main tank fuel body or the reserve body of fuel in the canister, and with the canister reservoir fuel reserve being maintained in a non-overflow state with bypass fuel return under normal operating conditions so that all of the advantages of in-tank canister reservoirs are obtained as well as all of the advantages of turbine vane fuel pump performance, while also enhancing the self-vapor-purging capability of the vapor purging system built into the pump and insuring return of twice-filtered bypass fuel to the pump inlet in preference to overflow return to the fuel tank.

Yet another object of the present invention is to provide a fuel delivery system of the aforementioned character in which the canister reservoir can be made in varying sizes and capacities as permitted by the vehicle tank configuration, while also being capable in some embodiments of utilizing existing canister reservoir diaphragm operated bottom outlet valves or, alternatively, utilizing improved canister outlet fuel flow control systems and constructions of the invention for preventing fuel starvation of the pump inlet and operable at pump shut down to backflush contaminants from the exterior of the main filter.

Additional objects, features and advantages of this invention are to provide a vehicle in-tank fuel delivery module of the aforementioned character with the fuel pump mounted directly in the main body of fuel in vehicle fuel tank and in which an associated in-tank canister reservoir supplies fuel to the pump through the interior of a main pump inlet filter when the flow of fuel from the main tank is interrupted, the fuel supplied during interruption is twice filtered, admission of air and fuel vapor to the pump inlet is inhibited during interruption of the supply of fuel from the tank, and the canister and pump assembly is compact, rugged, durable, reliable, of relatively simple design, economical manufacture and assembly, and in service has a long useful life.

SUMMARY OF THE INVENTION

In general, and by way of summary description and not by way of limitation, the foregoing objects are achieved by providing in accordance with the invention an electric fuel pump, preferably turbine vane type having a vapor purge system, mounted in bottom-seeking manner directly in the main body of liquid fuel in a vehicle fuel tank with a fuel inlet connected to the tank fuel via main fuel filter chamber disposed in the bottom of the tank, such as in a swirl pot basin. A fuel outlet of the pump supplies fuel for a vehicle engine and also communicates through a bypass, such as a pressure regulator, with an open-top in-tank reservoir canister mounted in a compact manner laterally adjacent the pump. The canister accumulates a reserve of filtered and bypassed fuel therein, and preferably adjacent its bottom communicates through a calibrated orifice, and in one embodiment also through a diaphragm actuated valve, and a secondary filter with the main filter chamber to maximize return of bypass fuel to the pump inlet and to provide an auxiliary supply of fuel to the pump inlet when there is an interruption of fuel from the tank to the filter.

In one embodiment the second filter overlies the orifice and is located in the reservoir canister so that bypassed reserve fuel is twice filtered. In another embodiment the secondary filter is located beneath the reservoir outlet so that bypassed reserve fuel is again filtered on its return path to the pump inlet, and communicates with both the reservoir outlet and main fuel tank to provide a secondary in-take flow path from main tank to pump inlet in parallel with the main filter. In both embodiments the secondary filter communicates, directly or indirectly, with the interior of the fuel tank to permit any vapor in the fuel to be separated by the secondary filter and except to the tank headspace. When the canister overflows, excess bypassed fuel is discharged through the open top of the canister into the tank.

Preferably, both the main and secondary filters are made of a mesh plastic material, such as a woven fabric, having openings with an average size not greater than about 100 microns through which liquid fuel will pass when the material is immersed in fuel, and if wet with fuel when exposed to air will resist and prevent the flow of air through the filter material due to capillary action of the wetted filter material. Thus, when the supply of fuel from the tank to the filter is temporarily interrupted, the pump draws additional bypass fuel from the reservoir through the canister outlet and the interior of the main filter chamber into the pump inlet. A baffle is received in an envelope of the main filter material or a perforate retainer overlies a single ply of main filter material to prevent the filter material from restricting or closing off the flow of fuel from the canister orifice to the pump inlet when the fuel supply from the tank is temporarily interrupted. The interior of the main filter chamber also provides a partial reservoir of fuel to be supplied to the pump inlet when the supply of fuel from the tank is temporarily interrupted.

Preferably, the fuel pump is a turbine vane type provided with a built-in vapor purging system having a vapor purge inlet communicating with the low pressure zone of the rotary pump chamber and a vapor purge outlet leading to the exterior of the pump casing generally at or slightly above the elevation of the pump fuel inlet. Because the pump is mounted directly in the main body of liquid fuel in the tank, outside the reservoir canister, the pump inlet and pump vapor port outlet are both exposed to the substantially the same gravity pressure head being exerted by the main body of fuel in the tank. Therefore the head of fuel in the canister reservoir, regardless of its magnitude, will not impede or impair self purging of vapor by the pump.

In another embodiment of the invention the canister reservoir is enlarged in capacity without increasing overall base dimensions, to provide a reserve capacity similar to typical fuel sender modules having reservoir canisters containing fuel pumps therein. A "switchover" and bypass return regulator structure is provided at the bottom of the canister comprising a bottom septum partially or fully closed by a movable valve. A diaphragm made of filter material extends over this canister valve to filter reserve and/or tank fuel entering the pump inlet via the main filter chamber and to operate the reserve supply valve to regulate return of bypassed reserve fuel to the pump, the valve being moved fully open under fuel starvation conditions and high pump demand. A bottom base subassembly containing the secondary filter diaphragm valve and main filter supports the canister and fuel pump and communicates the pump inlet with the main body of the fuel in the tank downstream of both the main and secondary filters. The secondary filter acts as a diaphragm type canister bottom outlet valve and is mechanically associated centrally with a biasing spring that normally biases the secondary filter diaphragm valve closed. The diaphragm valve is alternately provided either with an always-open orifice controlling bypass reserve fuel return or is completely sealed to achieve complete shut off bypassed fuel return flow from the canister bottom outlet. With both forms of diaphragm valve, and under conditions where the bottom of the main filter chamber is starved of liquid fuel from the main tank body of fuel, the secondary filter acts in response to pump suction as a diaphragm to shift against the resilient bias of the spring and variably open the canister bottom outlet to admit reservoir fuel from the canister to the pump inlet to thereby either augment or to initiate bypass fuel return to the pump.

At pump shut down, the calibrated orifice embodiments cooperate with whatever gravity head differential is available to act on bypass reserve fuel in the canister to backwash at least the main filter, and in the diaphragm valve embodiment, also the secondary filter. In the latter case, the secondary filter is disposed at a higher elevation than the main filter and provides a parallel intake flow path to the pump inlet from the main tank to thus provide a fail-safe feature in the event of main filter clogging.

BRIEF DESCRIPTION OF THE DRAWINGS

The foregoing and other objects, features and advantages will be apparent from the following detailed description of presently preferred embodiments and the best mode of making and using the invention, and from the appended claims and accompanying drawings (which are drawn to engineering scale unless otherwise indicated) in which:

FIG. 11 is an exploded perspective view of the base subassembly of the module assembly of FIGS. 3–10;

FIG. 12 is another exploded perspective view of the base subassembly shown in FIG. 11 but viewed at a different perspective angle;

DETAILED DESCRIPTION OF PREFERRED EMBODIMENTS

First Embodiment

Figure 1:
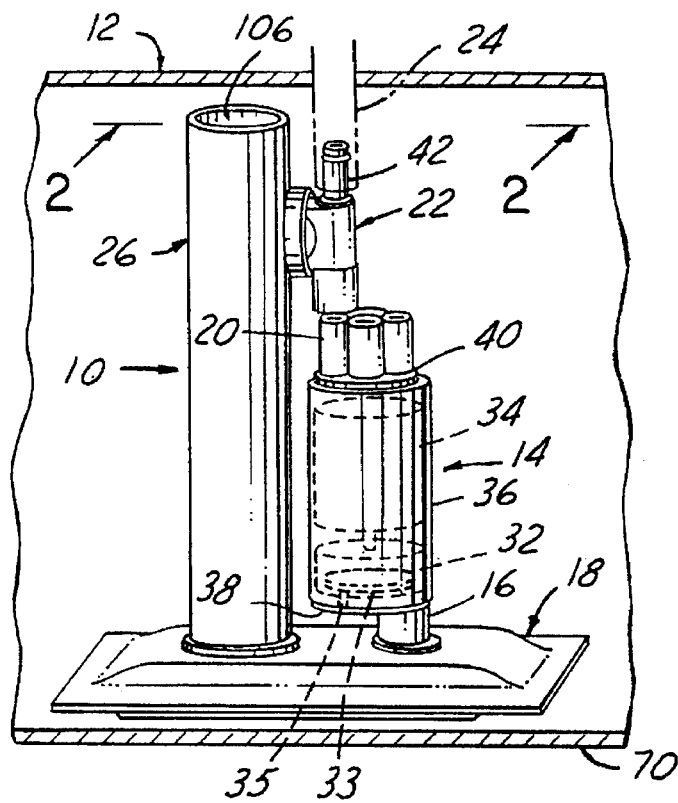
FIG. 1 is a perspective view of a first embodiment of a fuel delivery canister reservoir and pump module assembly embodying this invention mounted in a fuel tank of an automotive vehicle.

FIG. 1 illustrates a first embodiment of a fuel pump module assembly 10 embodying this invention mounted in a fuel tank 12 of a vehicle, such as an automobile, for supplying liquid hydrocarbon fuel, such as gasoline, to a vehicle engine which is typically fuel injected. The assembly has an electric fuel pump 14 with an inlet 16 connected to a primary or main fuel filter 18 and an outlet 20 connected to a bypass regulator 22 which regulates the pressure of fuel supplied to the engine through a conduit 24. A fuel reservoir canister 26 is connected adjacent its upper end to the bypassed fuel outlet 28 of the regulator 22 and at its lower end to the interior of filter 18 through an orifice plate 30.

Figure 2:
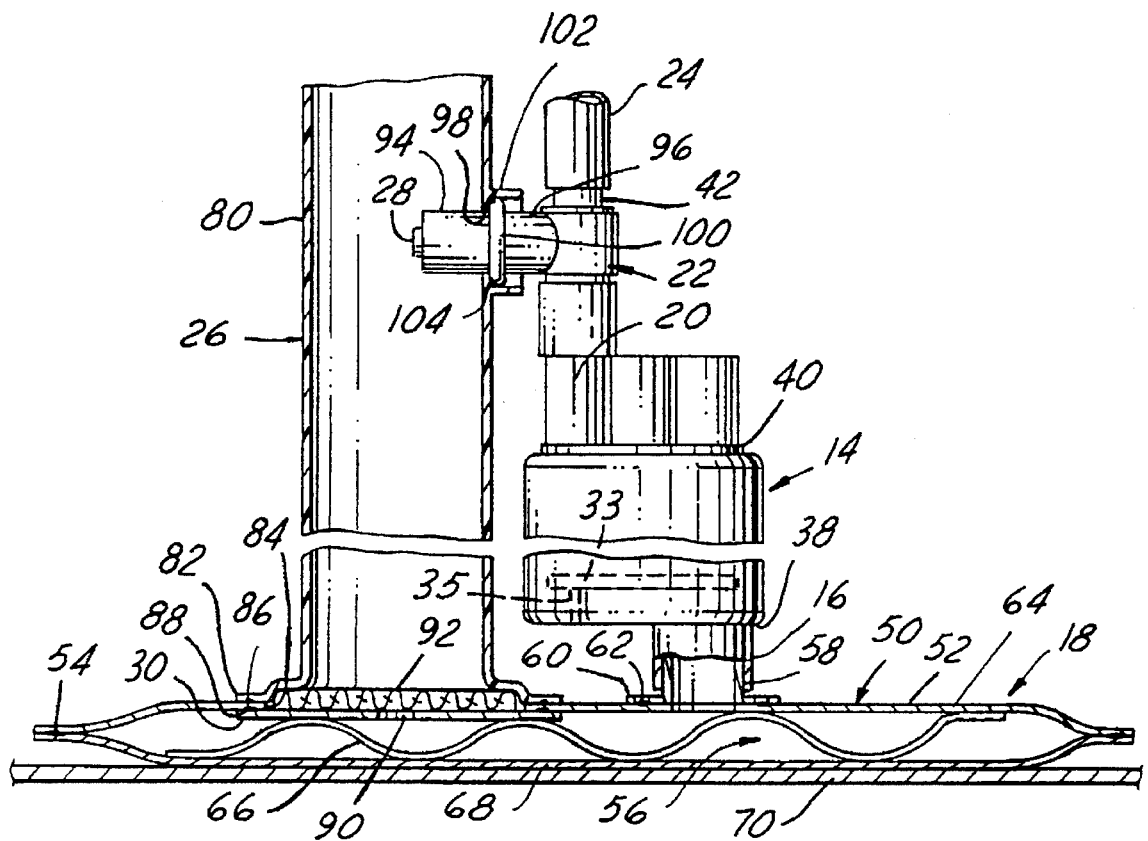
FIG. 2 is an enlarged fragmentary side view of the pump and canister assembly of FIG. 1 with portions broken away and shown in section.

The fuel pump 14 has a pump assembly 32 (FIG. 1) driven by an electric motor 34 both of which are sealed in a cylindrical housing 36 with a bottom inlet end cap 38 and top outlet end cap 40 (see also FIG. 2). The pump 32 is preferably a turbine type pump but alternatively it may be a positive displacement type pump. A suitable positive displacement gear rotor type electric fuel pump is disclosed in U.S. Pat. No. 4,697,995, and a suitable turbine regenerative fuel pump is shown in U.S. Pat. No. 5,257,916, the disclosures of which are incorporated herein by reference and hence the pump 14 will not be described in further detail. However, it is to be noted that each of these patents disclose rotary pumps with a built-in vapor purging system to allow purging of vapor from the pump to enable the pump to be self-priming and to pump against a pressurized fuel line under hot fuel conditions.

Figure 4:
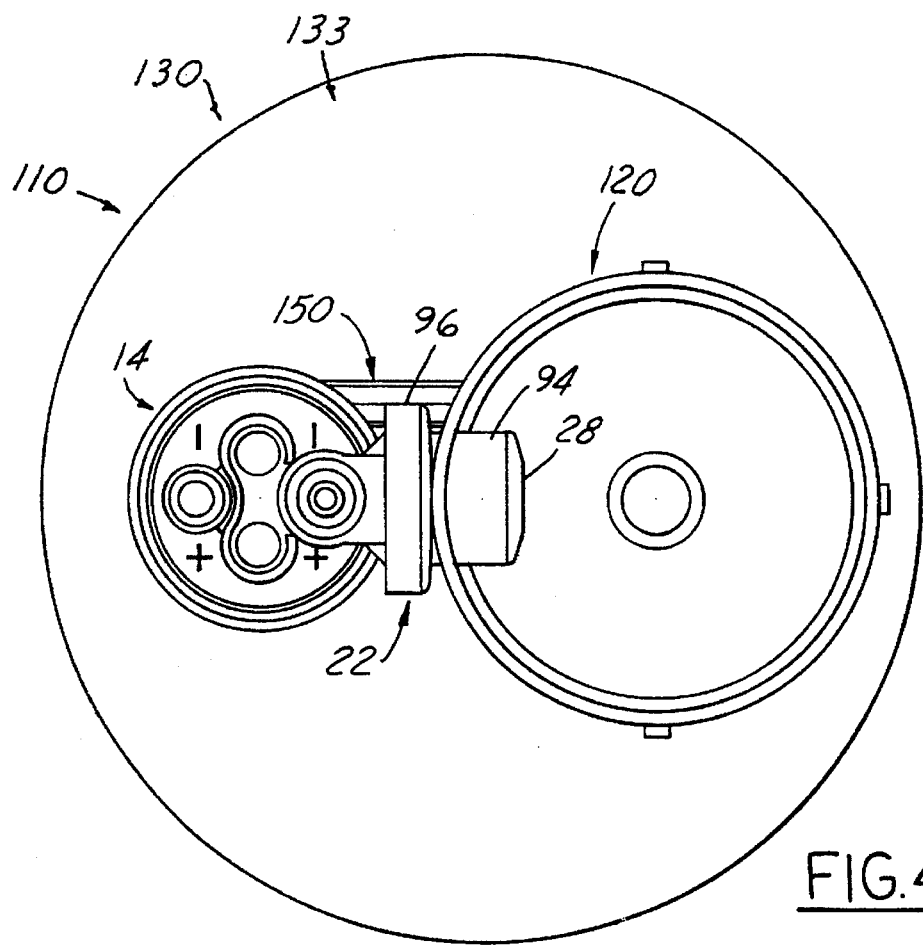
FIG. 4 is a top plan view of the fuel pump and reservoir canister of the second embodiment shown by itself.

Referring more particularly to the gear rotor pump of the '995 patent, and parenthetically using the reference numerals appearing therein, the vapor purging is accomplished by providing a passage (110) opening to the interface of the inlet housing (FIGS. 1 and 4) and angling at (112) to the outer surface of the circular wall (100) forming the lower end cap of the pump. A small hole is punched in the flexible plate (60) provided in this pump in order to register with the passage (110). A small pocket (114) is provided in the radial face of the inlet housing to prevent possible blocking of the purged passage outlet (112) by a filter connector mounted on the inlet housing (10). Note that purge vapor outlet pocket (114) is generally at the elevation of the pump inlet port (90). Purge port (110) allows vapor in the pumping chamber to escape to the fuel tank early in the compressive stage of the pump rotation so that the intake port of the pump can draw fuel in, thus to facilitate priming. Accordingly, the pump can develop normal operating pressure to prime, when starting initially, and overcome the stored pressure in the fuel line upon restart. This facilitates quick priming to obtain the required pumping pressure on hot fuel which is subject to vaporization.

Similarly, and referring now to the turbine regenerative fuel pump 20 of the aforementioned '916 patent, and again parenthetically using the reference numerals appearing therein, a vapor port (72) opens into the upstream region of the pumping channel (62) immediately adjacent the downstream region. In particular, vapor port (72) opens to channel section (62) adjacent to the leading edge of the grooves (70), i.e., at the edge of the groove array proximate to pump inlet port (56). Again, it is to be noted that the lower end cap side plate (26) of pump (20) is provided with the vapor port (72) and hence port (72) leads to the exterior of the lower end of the pump through the end plate and is generally at the elevation of pump inlet (58).

Thus in the electric motor-pump assembly 14 of FIGS. 1 and 2 herein, the rotary pump 32 of the assembly is shown diagrammatically with a pumping chamber 33 (shown with broken lines) and associated vapor purge port passage 35 (also shown in broken lines) leading from pump chamber 33 down through end cap 38 to an outlet communicating directly with the interior of tank 12. Purge outlet 35 is disposed slightly above the elevation of the pump inlet 16 which in turn also communicates directly with the interior of the tank (through primary filter 18). Vapor port passage 35 thus corresponds to passage 110, 112 in the '995 patent and to vapor port 72 of the 916 patent, and functions in similar but enhanced manner in accordance with a further feature of the present invention because of the manner in which pump assembly 14 is exteriorly associated with the fuel reservoir canister 26 in accordance with the invention.

In normal operation, the pump 14 operates at constant speed and supplies a greater quantity of fuel to the pressure regulator 22 than is needed even to meet the maximum demand of the operating engine. Regulator 22 maintains a substantially constant pressure of fuel supplied through its outlet 42 to the engine by bypassing or discharging excess fuel through its bypass outlet 28 into the reserve fuel reservoir of canister 26 and at a variable flow rate inverse to that flowing in line 24 to the engine. Typically, the pressure regulator has a flow rate control valve actuated by a diaphragm in response to changing fuel demand of the engine to maintain a substantially constant output pressure. Typically, the regulator will maintain a substantially constant output pressure, such as 50 psig, with a pressure drop of about 1 psi over the full range of variation of the fuel flow rate to the engine from 0 to 40 gallons per hour. Preferably, the fuel pump assembly 10 is used in a no-return fuel system which does not have any line returning fuel from the downstream side of the engine fuel injectors or the fuel rail to the fuel tank. Suitable pressure regulators 22 for no-return fuel systems are disclosed in U.S. Pat. Nos. 5,220,941 and 5,398,655, the disclosures of which are incorporated herein by reference and hence the pressure regulator 22 will not be described in greater detail.

The primary filter 18 has a bag or envelope 50 formed from a sheet 52 of a flexible filter material of a fine mesh, such as a plastic material, which is heat sealed together around its periphery 54. The interior chamber 56 of the envelope communicates through an outlet 58 with the inlet 16 of the pump into which it is slidably received and frictionally retained with an interference fit. Preferably, the outlet 58 is made of a plastic material and has a peripheral flange 60 secured and sealed by a heat seal 62 to the upper wall 64 of the sheet filter material 52. Preferably, a fuel-permeable spacer, such as a flexible corrugated baffle 66, which can be made of a resilient plastic material, is received in the envelope 50 to prevent the flexible bottom wall 68 of the filter material 52 from collapsing under the weight of the pump assembly, and from being forced upwardly by pump suction onto the outlet 58 in the upper wall 64 and thereby restricting flow of fuel through the outlet and into the pump inlet 16. As best seen in FIG. 1, the baffle 16 is narrower in width than envelope 18 to thereby enable free flow of fuel within the envelope around the side edges of the baffle so that the baffle can be made of imperforate material, if desired. In use, the filter 18 and the pump inlet 16 lie closely adjacent to the bottom of the fuel tank 12, and preferably the bottom wall 68 of the fuel filter lies on the bottom wall 70 of the lowermost portion of the fuel tank (e.g., within a tank swirl pot). For this purpose module assembly 10 is preferably vertically movably supported from a conventional tank top mounting flange (not shown) on a suitable conventional telescopic type support fixture (not shown) so as to be gravitationally biased, and also, if desired, spring biased and pressurized outlet hose biased, downwardly as a "bottom-seeking" type fuel sender module.

Preferably, reservoir canister 26 is formed by a tube 80, preferably made of a fuel-compatible plastic material such as Acetal, with a peripheral flange 82 at its lower end which overlies an opening 84 through the upper wall 64 of the filter material and is attached and sealed to it by a heat seal 86. The underlying orifice plate 30 is also secured and sealed to the flange and the adjoining filter wall by a heat seal 88 to close the bottom of the reservoir tube 80 so that fuel will flow from the bottom of the reservoir only through a calibrated orifice 90 in the plate. The orifice 90 is sized so that the reservoir tube 80 will be substantially completely filled with fuel discharged from the bypass outlet 28 of the pressure regulator 22 during normal operation of the pump. For fuel pumps having an output capacity under normal operating pressure conditions of up to about 40 gallons per hour, the orifice 90 typically has a diameter in the range of about 0.10 to 0.20 of an inch. In other words, the flow controlling cross section of orifice 90 is thus correlated with pump output and engine fuel demand parameters to obtain a reserve fuel flow "balance" between bypass fuel input to canister 26, and reserve fuel canister outflow via orifice 90 and back through main filter chamber 56 to the pump inlet 16, to establish a maximum gravity reserve head of fuel in the canister with minimum, if any, overflow from the open top of canister 26 back into the main tank.

Preferably, to further filter fuel supplied from the reservoir 26, a secondary filter 92 is disposed in the bottom of the tube 80 and overlying the orifice 90. Preferably, filter 92 has a finer mesh or openings size than the primary filter 18 and typically has an opening average size not greater than about 60 microns. Preferably, the secondary filter has an average opening or pore size of about 30 to 40 microns and the primary filter has an average opening or pore size of about 60 to 70 microns. To insure that any air or gaseous vapor in the liquid reserve fuel does not block or restrict the flow through the orifice 90, the filter 92 is disposed above the orifice rather than below it so vapor can indirectly escape to the tank headspace upwardly through the body reserve fuel in the canister. In use, the baffle 66 also insures that the flexible bottom wall 68 of the filter material is not forced or collapsed onto the orifice 90 which would block the flow of reserve fuel down through the orifice and via the interior chamber 56 of the filter to the pump inlet 16.

Adjacent the upper end of reservoir tube 80, a cylindrical portion 94 of the housing 96 of the pressure regulator 22 projects through a bore 98 in the sidewall of the tube 80. A peripheral annular flange 100 is pressed with an interference fit into a collar 102 coaxial with and encircling the bore and integral with the tube. Preferably, an O-ring 104 provides a seal between the regulator housing 96 and the tube 80. The upper end 106 of the reservoir tube 80 opens into the fuel tank headspace and thus prevents any pressure build-up from bypass fuel flow input that would occur if the canister top were sealed, and thus permits excess reserve bypass fuel to flow out of the top of the reservoir tube into the fuel tank. The open-top canister also permits any air or vapor in the fuel in the reservoir tube to rise and separate from the reserve fuel and pass through the open end 106 into the vapor dome headspace in the fuel tank.

Figure 3:
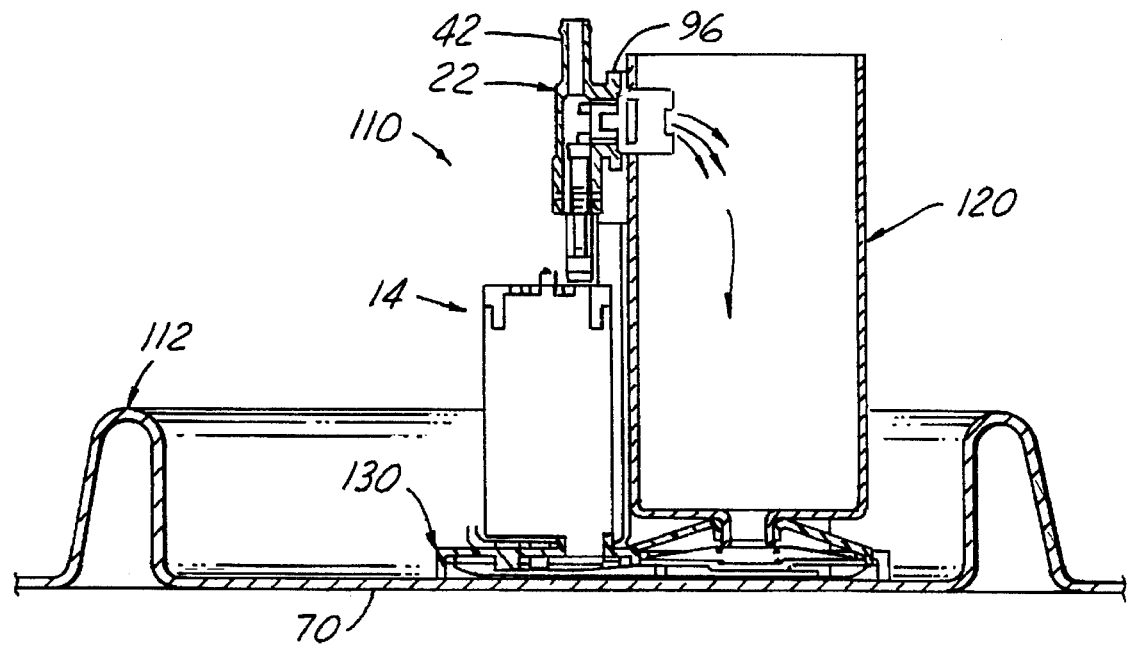
FIG. 3 is a simplified and fragmentary view of a second embodiment fuel delivery canister reservoir and pump module assembly of the invention.

In use, the fuel pump module 10 is mounted in the fuel tank with the reservoir canister tube 80 extending generally vertically and the fuel filter 18 immediately adjacent the lowermost bottom portion 70 of the fuel tank and preferably resting on the bottom 70 of the tank as a "bottom-seeking" module. In fuel tanks provided with a molded-in or stamped-in "swirl pot" in the lowermost region of the tank (see FIG. 3), the relatively compact lateral dimensions of module 10 with its elongate filter 18 enable the same to fit within the sometimes narrow confines of such a swirl pot. In normal use, the fuel tank is at least partially full of a liquid fuel, such as gasoline, to a level above the filter 18 so that the filter and the pump inlet 16 are completely immersed in fuel.

In normal operation of the electric fuel pump 14, fuel is drawn from the main body of fuel in the tank through the filter 18 into the inlet 16 of the pump and discharged from the outlet 20 of the pump into the inlet of the pressure regulator 22 which supplies through its outlet 42 fuel to the engine at a substantially constant pressure, such as 50 psig and at a variable flow rate established by variable engine fuel demand. Regulator 22 maintains a substantially constant output pressure by bypassing a portion of the fuel supplied to its inlet and discharges the bypassed fuel through its bypass outlet 44 into the reservoir canister 26. In normal operation of the pump, due to the aforementioned canister reserve fuel head balance with calibrated orifice 90, fuel in the reservoir tube 80 rises to a level which is usually adjacent to or above the bypass outlet 28. In some normal operating conditions, such as extended periods of the engine idling or operating under a low load, the fuel level can rise to the top of tube 80 and overflow into the tank through the open upper end 106 of the tube. Thus, in normal operation, some of the fuel entering the reservoir also flows continuously out of the bottom of the tube through the secondary filter 92 and calibrated orifice 90, passes through the interior chamber 56 of the primary filter 18 and reenters the pump inlet 16 along with fuel drawn from the tank through the primary filter. Preferably, the maximum canister head reserve fuel level is maintained below canister overflow level so that as much as possible of the bypassed fuel, which has already been once filtered by passing through filter 18 to the pump inlet, is returned to the pump inlet after being again filtered through the secondary filter 92. This reduces the overall or average rate of fuel draw from tank 12 through filter 18 and hence reduces the rate of tank contaminant clogging of filter 18. It also maximizes the amount of twice-filtered fuel delivered to the engine.

When the fuel level in the tank becomes low enough, during normal operation of the vehicle, such as when turning corners or going up and down, or while parked on, a steep hill or incline, the remaining fuel in the tank will move away from the primary filter 18, thereby momentarily interrupting ("starving") the supply of fuel from the tank through the filter to the inlet 16 of the pump. During these fuel interruptions, the pump receives fuel from the reserve supply in reservoir canister 26 at a greater flow rate than when tank fuel is available at filter 18 due to the increase in negative pressure at orifice 90 exerted by pump suction under these adverse conditions. The reserve fuel thus flows through the secondary filter 92, calibrated orifice 90, interior chamber 56 of filter 18 and into the inlet 16 of the fuel pump at a sufficient rate to satisfy pump and engine fuel demand and thereby avoid fuel starvation interruption under such adverse conditions. Meanwhile, fuel in excess of engine demand continues to be returned into tube 80 from bypass regulator 22 to thereby prolong the availability of reserve fuel during such adverse conditions.

During the "starvation" interruption of fuel from the tank, the capillary action of the wet sheet of filter material 52 forming top and bottom envelope walls 64 and 68 prevents air and fuel vapor from passing through the filter material into the interior chamber 56 of the filter bag or envelope 50 and into the pump inlet. If the interruption of the fuel in the tank is of sufficient duration so that all of the reserve fuel in the reservoir canister 26 is consumed, then the filter envelope chamber 56 itself provides an additional reservoir or reserve of fuel which is supplied to the pump. Preferably, as this fuel is depleted, the walls 64 and 68 of the flexible filter material 52 collapse inwardly, but the baffle 66 prevents the filter material from restricting or closing off the pump inlet 16. This also insures that the filter material continues to be wetted by the remaining small quantity of fuel so that air and fuel vapor do not enter the pump inlet 16 until essentially all of the fuel has been consumed. The baffle also insures that when an essentially completely empty fuel tank is refilled, the walls of the filter 18 will be expanded into their normal operating position, thereby insuring that the inlet 16 of the fuel pump will be unrestricted when the engine is restarted.

It will also now be apparent from the foregoing description and drawings that, under normal operating conditions, tube 80 will normally be almost if not completely full of reserve fuel at engine shut-down. Although the reserve fuel during such engine-off periods can drain from tube 80 via calibrated orifice 90 and filter 18 and thus leak back into the main body of fuel in tank 12, this leakage will occur only to the extent that a gravity head pressure differential exists between fuel tank level, relative to orifice 90, and the reservoir fuel level in tube 80. Because this gravity-induced pressure differential is small as compared to the pump suction induced pressure differential when pump 32 is drawing reserve fuel via orifice 90, this engine-off "leak" flow rate is much less than "reserve pump draw" flow rate. Hence a reserve supply of fuel can be maintained in tube 80 available for engine re-start for a predetermined prolonged period even under pump inlet starvation conditions, e.g., the vehicle parked on a steep incline with a low level of fuel in tank 12.

In addition, it will be seen that such canister leakage occurring during engine (and hence pump) shut-down and low tank level conditions provides a backflow reserve fuel stream from orifice 90 into filter chamber 56 and then out through the pores of the filter envelope 50 into the main tank. This off-period backflow produces a backwashing action on filter 18 to cause much, if not all, of any contaminant particles clinging to the exterior surface of the filter to be flow carried off of the this surface and to re-settle or disperse in the tank. Clogging of filter 18 over its operational life is thus greatly reduced.

It will also now be apparent from the foregoing description and drawings that fuel delivery module 10 now enables use of a turbine type rotary vane fuel pump, such as that set forth in the aforementioned U.S. Pat. No. 5,257,916, in association with a reserve fuel reservoir canister without thereby disabling the operation of the vapor purging system 35 of the pump 32. As set forth previously, such disablement could occur if the turbine pump were disposed within the interior of the reservoir canister, and the outlet of pump purge port 35 were subjected to a gravity pressure head of reserve fuel in the canister exceeding the gravity pressure head of the main body of fuel in tank 12 by some given disabling amount, say two and half inches of water. However, in accordance with this feature of the invention, it will be seen that the outlet of the purge port communicates directly with the interior of tank 12, outside of reservoir canister 26. It will also be seen that the elevation of the outlet of purge passage 35 is generally at the same elevation of pump inlet 16 where it communicates with tank fuel, or only slightly vertically spaced from one another, but preferably with the outlet of purge passage 35 being slightly above the opening of pump inlet 16 to the tank. Hence the pressure differential existing between outlet of purge passage 35 and the pump inlet is minimized because they are both exposed directly at about the same elevation to only the same main body of fuel in the tank.

Moreover, with purge outlet 35 at about the same level as the opening of pump inlet 16 to the tank, the pressure differential therebetween is reversed relative to that which would exist in the case of pump 32 being submerged within the body of reserve fuel in a pump-within-canister system. Of course, once the tank level is low enough to drop below the lower end cap 38 of pump casing 36, the purge passage 35 will be exposed directly to the ambient air or vapor in the fuel tank. Thus, under such low fuel level conditions in the tank, when filter envelope 18 is starved of fuel as described previously and the envelope is acting as a capillary seal to the tank interior, the pressure head of reserve fuel in canister 26 will likewise not adversely effect the vapor purging action of the pump.

From the foregoing it will also now be appreciated that the same favorable vapor purging operational characteristics also could be obtained in accordance with the invention by mounting a turbine vane type regenerative fuel pump of the type disclosed in the aforementioned U.S. Pat. No. 5,257,916 within a suitably sized reservoir canister, such as that disclosed in the aforementioned U.S. Pat. No. 4,747,388 (also incorporated herein by reference), provided that the outlet of the purge port passage of the in canister pump is communicated directly to the exterior of the canister and hence to the tank interior at about pump inlet elevation while being isolated from the pressure head of the reserve fuel in the canister. This can be accomplished by inserting a small flexible plastic vent tube (not shown) at one end into the outlet of port passage 35 and leading the other outlet end of the tube in sealed relation and generally horizontally from port 35 out through a suitable aperture in the wall of the canister and out into the tank so that the vent tube outlet is at about the same elevation as the pump inlet.

However, with the preferred mounting of pump assembly 14 outside canister 26 and closely adjacent thereto, as illustrated in the first embodiment of FIGS. 1 and 2, there is no need for such a vapor purge vent tube connection to the tank interior. In addition, when the fuel pump is mounted directly in the tank interior, outside the reservoir canister, and utilized with a return-type fuel delivery system, the pump is not exposed to the hot fuel returned from the engine to the canister but rather is cooled by the main body of fuel in the tank, thereby tending to reduce flash vaporization of fuel in the pump chamber because of reduced temperature of the pump components.

Second Embodiment

FIGS. 3–33 illustrate a second embodiment of the invention that also utilizes the feature of the invention of mounting a turbine vane fuel pump assembly 14, having the aforementioned built-in vapor purging system 33, 35, 38, outside of, but closely adjacent to a canister reservoir so that the pump 32 and its vapor purge outlet 35 are mounted directly in the main body of fuel in the tank. In the second embodiment, a fuel pump/reservoir/canister base module assembly 110 is provided, preferably tank mounted and suspended in a conventional manner so as to be of the bottom seeking type, and adapted dimensionally for a drop-in installation through an opening in the top wall 24 of tank 12 to rest on its base at the bottom of a swivel pot basis 112 in tank 12.

Module 110 also includes a reservoir canister 120 (see particularly FIGS. 7–10) open at its upper end to communicate with the headspace or vapor dome in the interior of tank 12. Canister 120 is provided with a circular opening 124 which receives the cylindrical portion 94 of the housing 96 of pressure regulator 22 which is mounted to the canister in the manner of the first embodiment assembly 10 described previously.

Module 110 further includes a base subassembly 130 (shown generally in FIGS. 3–6 and in detail in FIGS. 11–18) of generally cylindrical configuration diametrically sized to slip through a tank mounting opening (not shown) when inserting the module into and through this opening in tank top wall 24. Base 130 is open at the bottom and provided at its outer periphery with four equally circumferentially spaced legs 132 adapted to seat on the swivel pot or tank bottom wall 70. Base 130 has a disc-like flange component 133 from which protrudes integrally upwardly a specially configured open spider leg mounting boss 134. Boss 134 carries a central raised canister mounting ring 136 with an internal bore 138 which receives a downwardly protruding neck 140 of the bottom wall 142 of canister 120 which forms the counter bottom outlet 144. Base 130 is snap-fit assembled to the lower end of canister 122 by fitting canister neck 140 in ring 136.

Module assembly 110 additionally includes the turbine type fuel pump 14. Canister 120 is specially shaped (i.e., tall cylinder of narrow diameter) and laterally offset on base 130 to provide an exterior side nesting space for accommodating pump 14 in nested relation along one side of canister 120. Pump 14 in assembly thus does not protrude beyond the exterior dimensions of base 130 to permit module 110 to be fitted within the tank top wall opening when pump 14 is in assembled relation as part of module 110.

The flat wall 146 of flange 133 in the pump recess area adjacent canister 120 is provided with an upwardly flanged neck 148 to receive an anti-rotation rubber grommet seal (not shown). When base 130 is snap fit to canister 120, the pump inlet boss 16 is also sealably received with a press fit in the grommet and flange neck 148 to thereby mount the lower end of the pump on base 130 after pump 14 has been preassembled to canister 120. Wall 146 of flange 133 is also provided with an upwardly protruding horizontally elongated open top drain trough 150 constructed as shown in detail in FIGS. 13–17 which extends from a curved end wall 152 to an open end outlet 154 leading to the edge of a circular opening 156 in flange wall 146. When pump 14 is mounted on flange 133 its vapor purge outlet port 35 is aligned over an inclined ramp 158 of trough 150 so that fuel expelled from the pump chamber 33 of pump 32 via the purge port 35 is directed into trough 150 and is channeled by the trough into flange opening 156.

As best seen in the exploded perspective views of FIGS. 11 and 12 and in the detail views of FIGS. 19–33, the remaining components of base assembly 130, in addition to flange 133, include a filter diaphragm 160, a ring-like diaphragm retainer 162 which overlies and is heat sealed to the outer peripheral edge of filter diaphragm 160, a spring cup 164 provided with a central calibrated orifice 166, a coil compression spring 168 having its upper coil nested in the turned-down flange 170 of cup 164, a spring retainer 170, a ring-like main filter retainer 172, a main filter support 174 and a disc-like main filter 176. The foregoing components of base assembly 130 are constructed to the configuration and geometry shown in the detail engineering views of FIGS. 19–33 and are scaled relative to one another as shown in perspective views of FIGS. 11 and 12, which also illustrate the order of their stack-up assembled relationship with flange 133. The base components are shown in final assembly in FIGS. 5 and 6.

Figure 5:
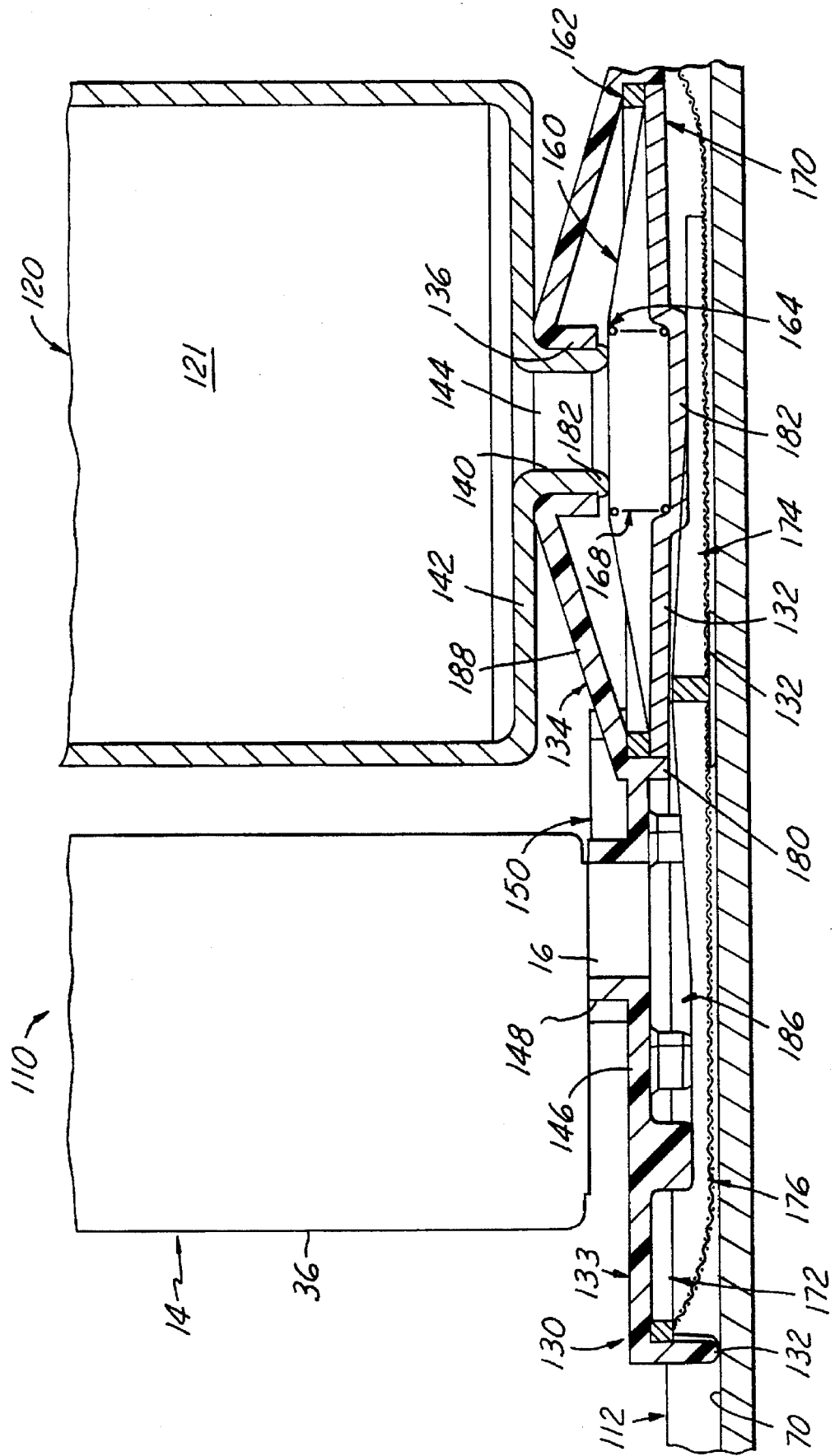
FIG. 5 is an enlarged fragmentary side elevational view, with portions shown in center section, of the canister and pump module assembly of FIGS. 3 and 4 with a canister bottom outlet filter diaphragm regulating valve shown in closed position.

Referring to FIG. 5, in conjunction with FIGS. 11–33, it will be seen that base 133 has a circular flange 180 (see also FIGS. 15 and 16) that defines the throughopening 156 in flange wall 146. Diaphragm retainer 162, with filter diaphragm 160 attached thereto at its outer edge, is press fit into flange 180 so that filter diaphragm 160 spans across opening 156 immediately beneath the outwardly flared lower annular edge 182 of canister neck 140. Spring retainer 170 is subassembled with spring 168, the spring bottom coil being seated on a downwardly indented central imperforate spring seat portion 182 of spring retainer 170. Spring cup 164 rests on the top coil of spring 168 with its peripheral flange 169 oriented downwardly. This subassembly is then inserted with a press fit upwardly into flange 180 in clamping relation with diaphragm retainer 162, to the position shown in FIG. 5.

Figure 6:
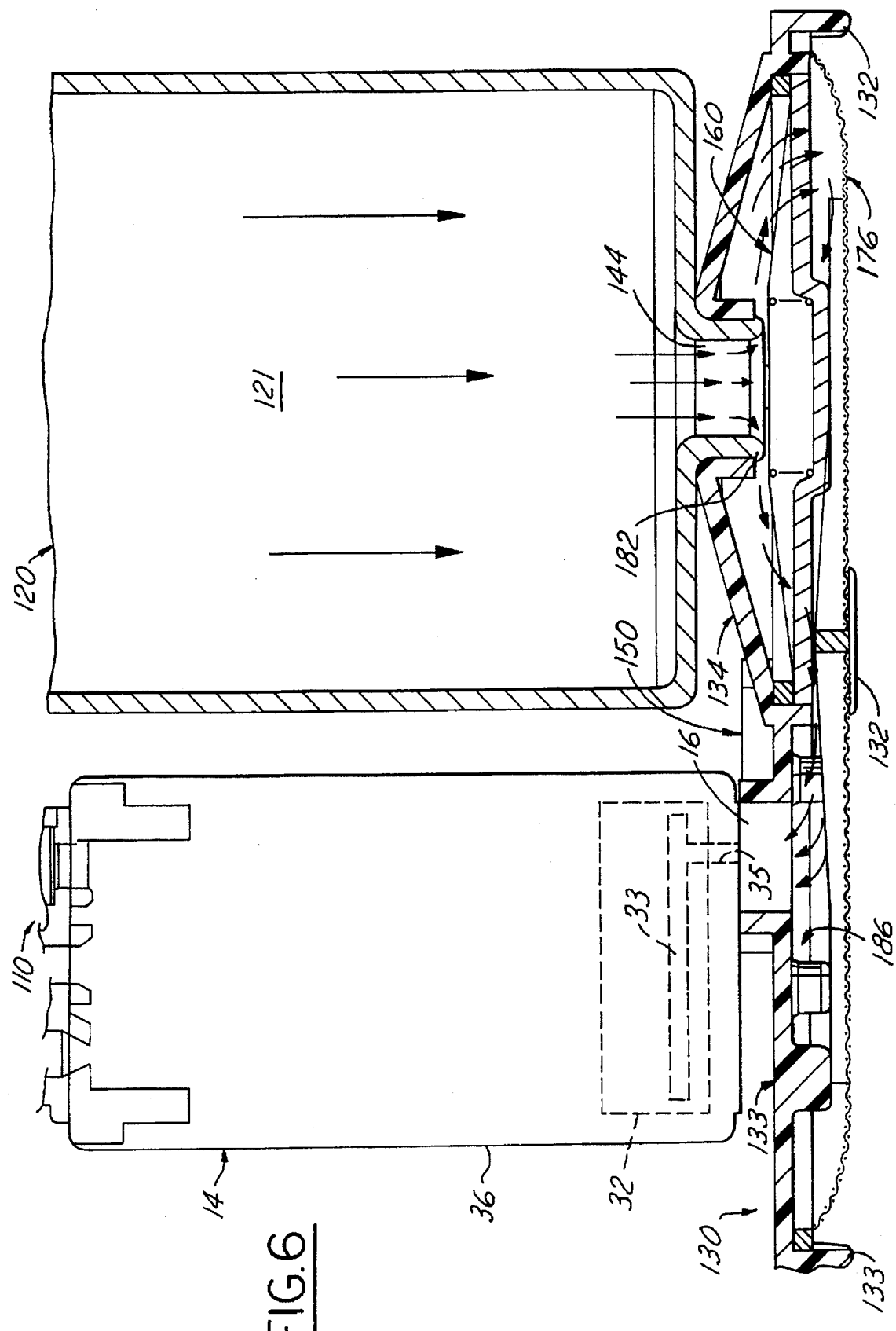
FIG. 6 is a view similar to that of FIG. 5 showing the valve in open position.
Figure 7:
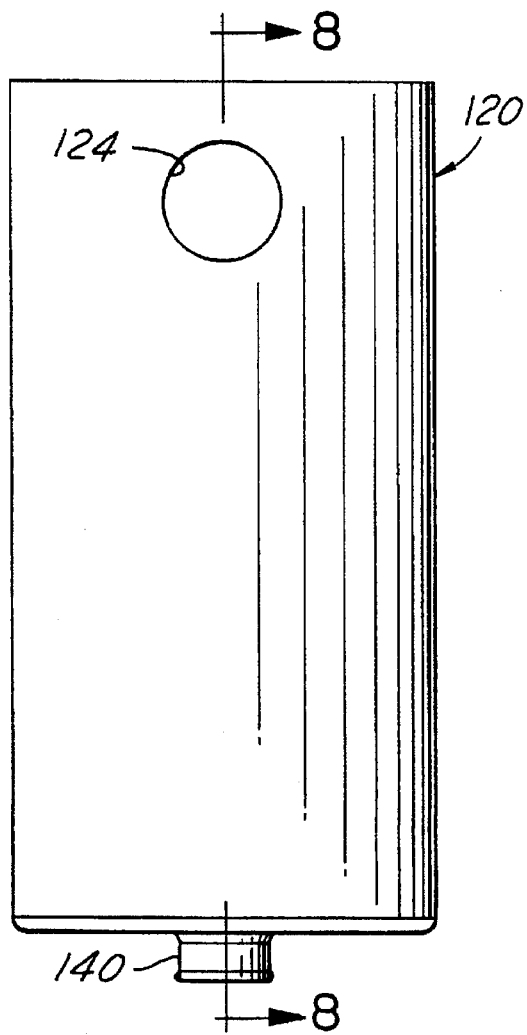
FIG. 7 is a side elevational view of the reservoir canister of FIGS. 3–6.
Figure 8:
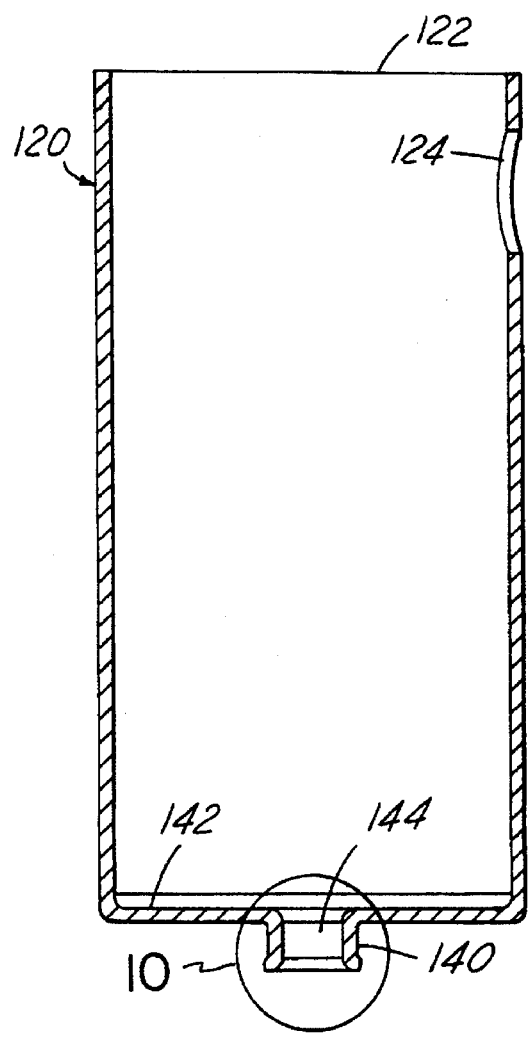
FIG. 8 is a cross sectional view taken on the line 8—8 of FIG. 7.
Figure 9:
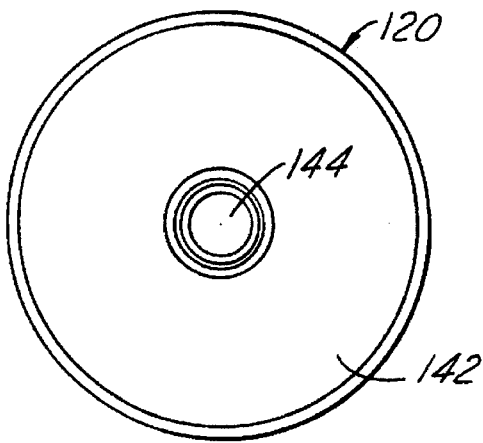
FIG. 9 is a bottom plan view of the reservoir canister shown in FIG. 7.
Figure 10:
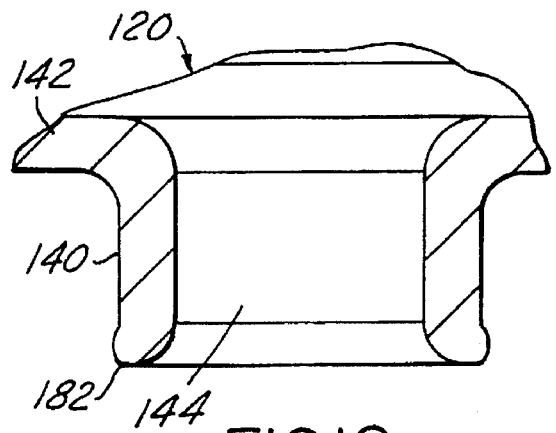
FIG. 10 is an enlarged fragmentary view of the portion of FIG. 8 encircled by the circle 10 therein.
Figure 14:
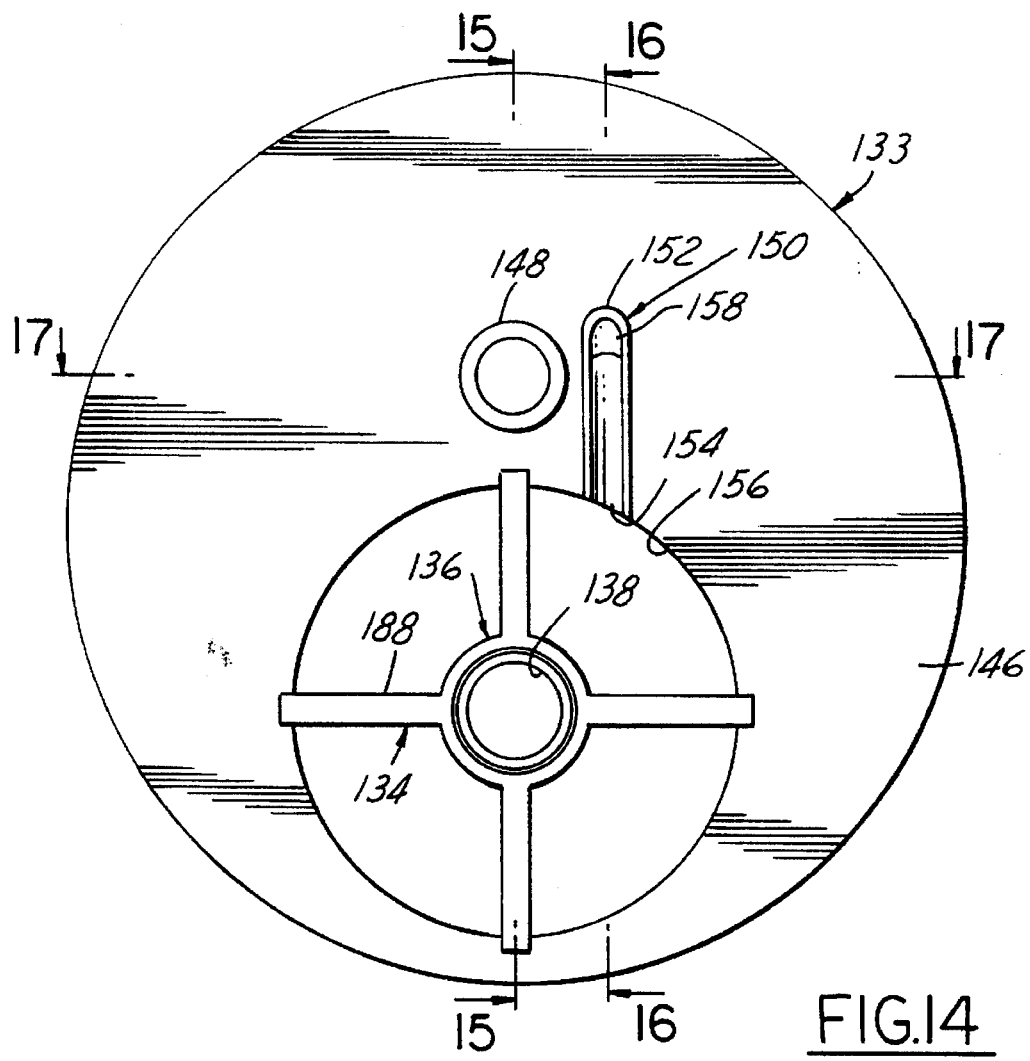
FIG. 14 is a top plan view of the flange component.
Figure 13:
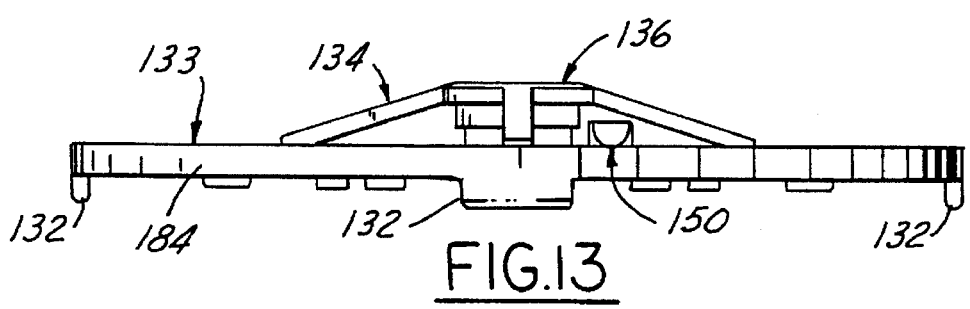
FIG. 13 is a side elevational view of the flange component of the base subassembly of FIGS. 3–12 shown to engineering scale.
Figure 15:
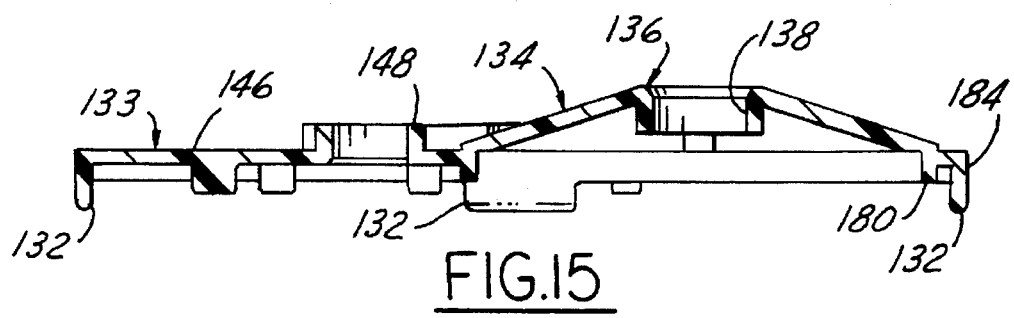
FIGS. 15, 16 and 17 are cross-sectional views taken respectively on the lines 15—15, 16—16 and 17—17 of FIG. 14.
Figure 16:
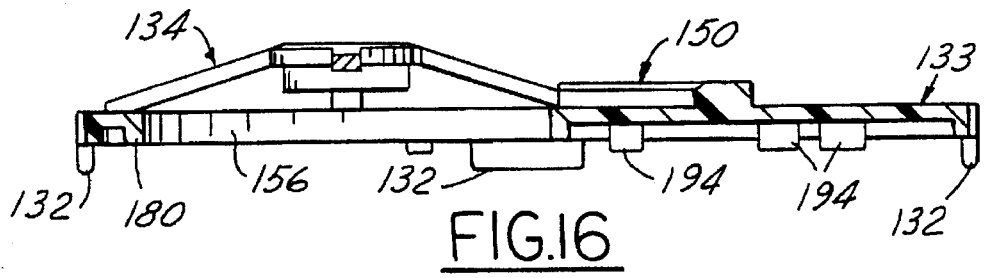
Figure 17:
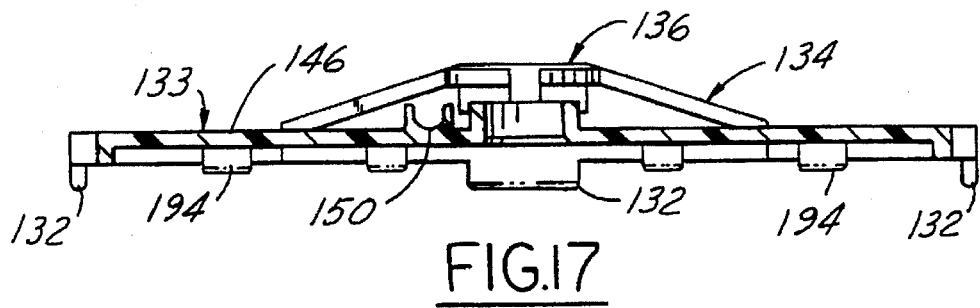
Figure 18:
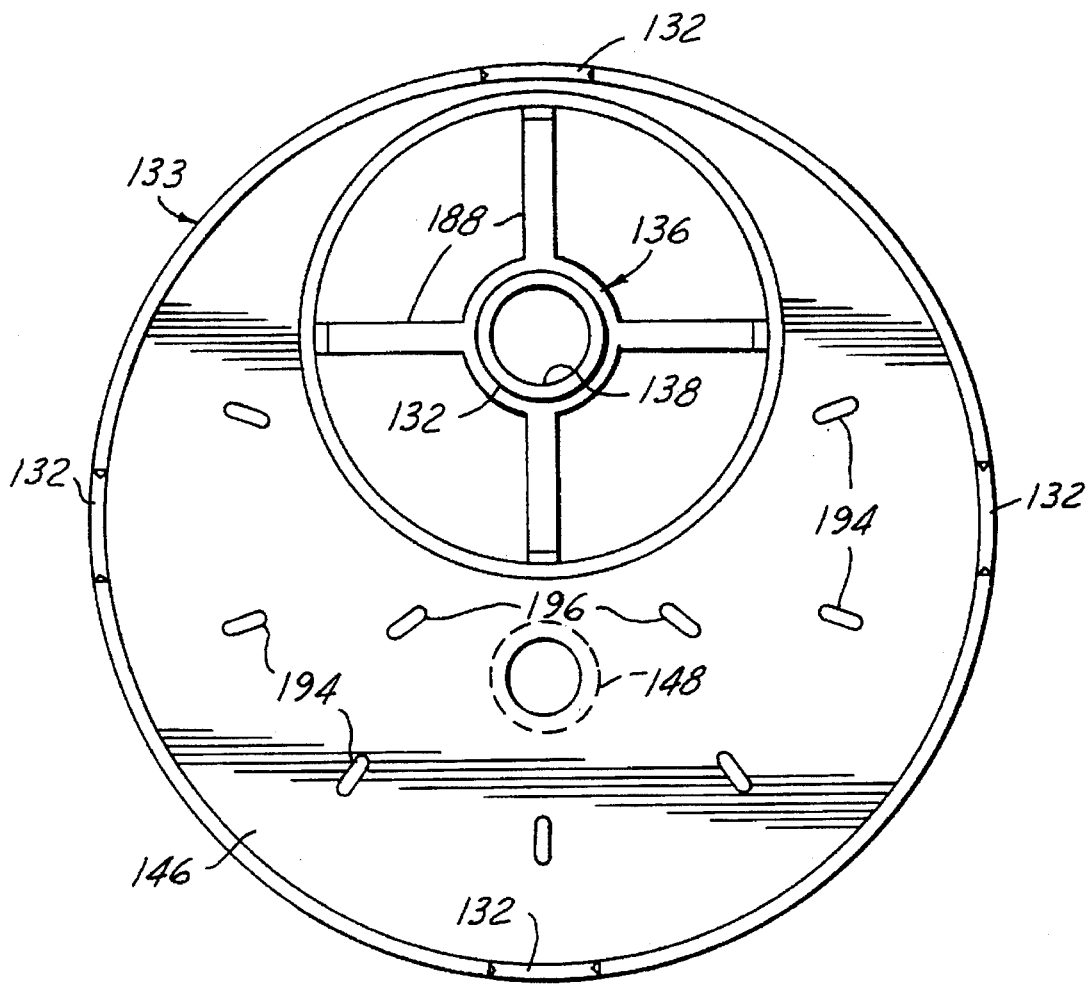
FIG. 18 is a bottom plan view of the flange component.
Figure 19:
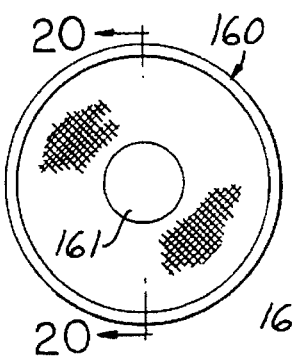
FIGS. 19 is a plan view of the filter diaphragm component of the base subassembly.
Figures 20, 21:
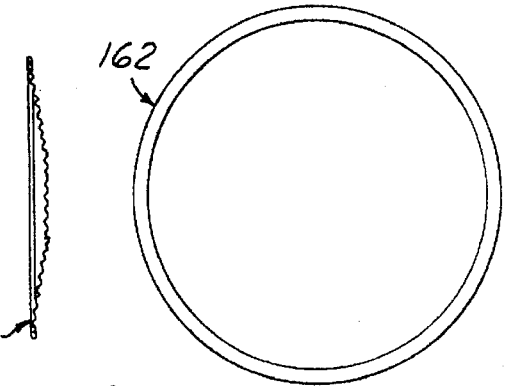
FIG. 20 is a cross-sectional view taken on the line 20—20 of FIG. 19.
FIGS. 21 and 22 are plan and side elevation views respectively of the diaphragm retainer component of the base subassembly, shown on a slightly larger scale than the associated filter diaphragm of FIGS. 19 and 20.
Figure 22:
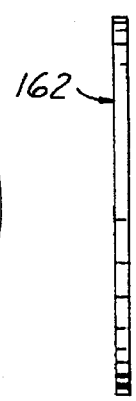
Figure 23:
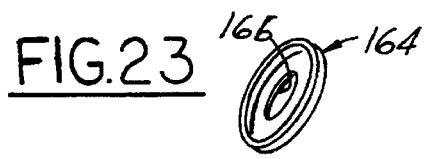
FIG. 23 is a perspective view of the filter diaphragm spring cup component of the base subassembly as alternately provided with a central calibrated orifice.
Figure 24:
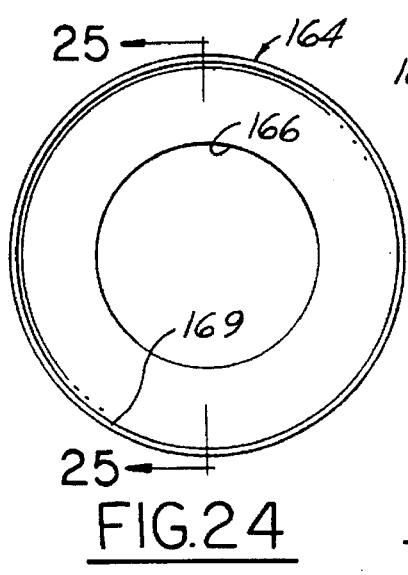
FIG. 24 is a plan view of the spring cup greatly enlarged over the showing thereof in FIG. 23.
Figure 25:
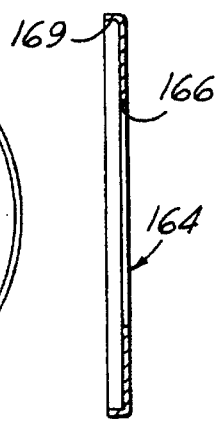
FIG. 25 is a cross-sectional view taken on the line 25—25 of FIG. 24.
Figure 26:
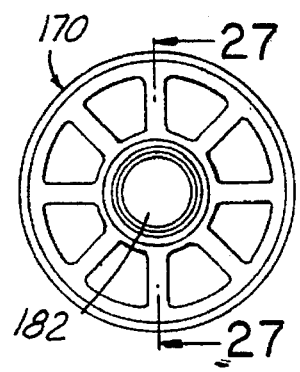
FIG. 26 is a plan view of the spring retainer component of the base subassembly.
Figure 27:
FIG. 27 is a cross-sectional view taken on the line 27—27 of FIG. 26.
Figure 28:
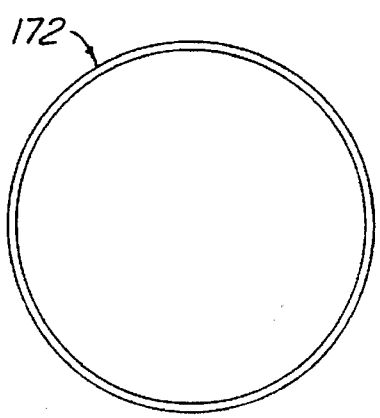
FIGS. 28 and 29 are plan and side elevational views respectively of the main or primary filter retainer component of the base subassembly.
Figure 29:
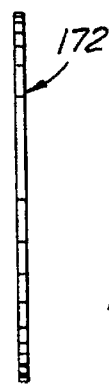
Figure 30:
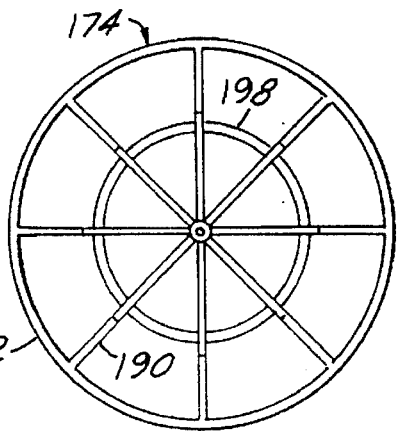
FIGS. 30 and 31 are plan and side elevational views of the filter support component of the base subassembly.
Figure 31:
Figure 32:
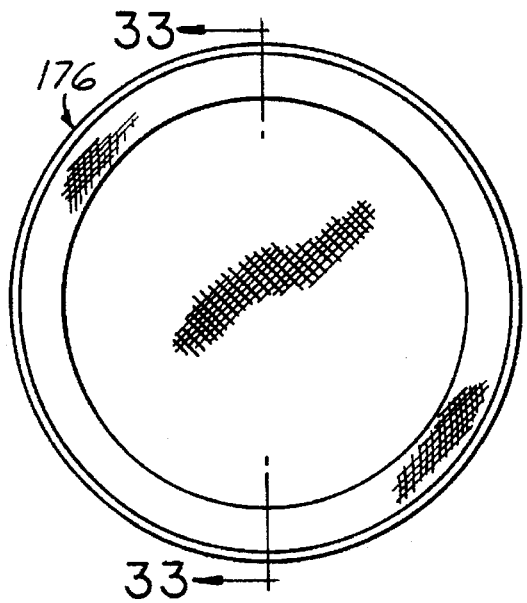
FIG. 32 is a plan view of the main filter component of the base subassembly.
Figure 33:
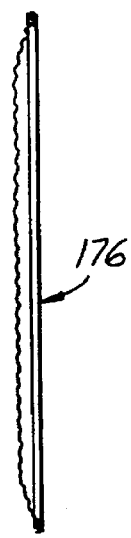
FIG. 33 is a cross-sectional view taken on the line 33—33 of FIG. 32.

The main or primary filter 176 is heat sealed or otherwise suitably fixedly bonded at its outer edge to the underside of filter retainer 172. Filter support 174 is a wagon wheel type open grid with dual concentric rim and inner rings 192 and 198, and is suitably centered on and fixed to the upper surface of filter 176 as shown in FIGS. 5 and 6. This main filter subassembly is telescopically press fit into the mating annular seat provided by the peripheral flange rim or skirt 184 which encircles the outer periphery of wall 146. The assembled position of primary filter 176, associated retainer 172 and filter support 174 is shown in FIGS. 5 and 6.

As so final assembled, base 130 of module assembly 110 in operative position rests on bottom wall 70 of the swirl pot 112 (or similarly on the conventional fuel tank bottom wall), and defines a main filter chamber 186 in the space beneath flange wall 146 and above primary or main filter 176. Chamber 186 communicates with both the fuel pump inlet 116 and with the space beneath the secondary filter diaphragm 160 through the open spokes of spring retainer 170. The primary fuel flow path from the fuel in swirl pot 112 into chamber 186 is through the clearance spaces between stand-off feet 132 and the under edge of skirt 184, and thence through main filter 176 into chamber 186. A parallel or secondary fuel flow path from the tank and swirl pot to main filter chamber 186 is provided by the four wide openings existing between the four spider legs 188 of canister support boss 134 of base 130, thence through the filter screen material of the filter diaphragm 160 and thence through the spaces between wagon wheel spokes 190 of filter support 174. In addition, as indicated previously, vapor purge bypass fuel exiting via purge port 35 is channeled by trough 150 into opening 156 to flow downwardly through filter diaphragm 160 into main filter chamber 186.

Upward movement of main filter 176 is limited by filter support 174 abutting at its outer rim 192 against the underside of a row of seven stand-off feet 194, and by inner ring 198 of filter support 170 abutting spring seat 182 of spring retainer 170.

In one alternative version of module assembly 110, spring cup 164 is provided with the calibrated central orifice 166 which registers with the circular central region 161 of diaphragm 160. Thus when orifice 166 is present it will also be seen that there is an always-open fuel flow path from the reserve fuel reservoir 121 of canister 120 downwardly through neck outlet 144, through the central region 161 of filter diaphragm 160, then downwardly through cup orifice 166 and thence out through the spaced coils of spring 168 into main filter chamber 186.

Alternatively, spring cup 164 can be made completely imperforate by elimination of calibrated orifice 166 therein so that the same operates to completely close and seal outlet 144 when spring 168 is biasing diaphragm filter 160 against the canister outlet annular valve seat formed by neck edge 182. This full sealing valve action can also be obtained by molding in a suitable rubber sealant material to thereby embed the mesh filter material of filter diaphragm 160 in this imperforate rubber material. The central region 161 of filter diaphragm 160 will thereby serve as an imperforate valve closure member overlying spring cup 164. Either form of spring cup 164 also functions to protect the material of diaphragm filter 160 from undue wear or being torn by the spring end coil.

In use, the fuel pump and canister module 110 is mounted in the fuel tank 12 with the reservoir canister 120 extending generally vertically so that primary fuel filter 176 is disposed immediately adjacent the bottom wall 70 of swivel pot 112 or the fuel tank and preferably resting thereon. In normal use the fuel tank is at least partially full of liquid fuel, such as gasoline, to a level above both primary filter 176 as well as secondary diaphragm filter 160 so that these filters and the pump inlet 16 are completely submerged in the main body of tank fuel or at least the body of fuel in swirl pot 112.

In the normal operation of pump assembly 14, fuel is drawn from the main body of fuel in the tank via both filters 176 and 160 into main filter chamber 186 and thence into pump inlet 16. A variable fuel flow is discharged from the pump outlet 42 and via line 24 to the engine fuel rail (not shown) at substantially constant pressure, such as 50 psig. Again regulator 22 maintains a substantially constant output pressure by return-bypassing a portion of the fuel supplied in excess of engine demand, the regulator discharging the excess bypassed fuel through its outlet 28 into the upper region of reservoir chamber 121 of canister 120. In normal operation of the pump, fuel in the reservoir canister 120 rises to a level which is usually adjacent or somewhat below the open upper end 122 of canister 120. In some normal operating conditions, such as extended periods of the engine idling or operating under a lower load, the fuel rises to the top of canister 120 and overflows through the open upper end 122 of the canister into the main body of fuel in the swivel pot 112 or into the fuel level is above the swivel pot tank.

Under low tank fuel level conditions the pump inlet 16 can be starved when the remaining fuel in the tank moves away from both the primary filter 176 as well as secondary diaphragm filter 160, such as during the aforementioned cornering of the vehicle and/or severe inclination of the tank. The filter screen mesh material of both diaphragm filter 160 and main filter 176 will likewise be starved of fuel but will remain wet with fuel. Under these conditions, air in the main tank being drawn toward the pump inlet by pump suction will try to pass through these filter materials. However these wet filters will reject the passage of air due to the liquid capillary seal of these wet filter materials. The pressure drop in chamber 186 below diaphragm filter 160 created by the pump will then cause the filter to act as a diaphragm to move it downwardly. This motion will compress spring 168 and lower the material of filter 160 downwardly off its neck seat 182 to thereby open communication via the relatively large diameter outlet 144 between reservoir chamber 121 and the area over the upper surface of filter 160. Reserve fuel may then flow rapidly downwardly from the reservoir canister outlet and laterally over and through diaphragm 160 into main filter chamber 186, and thence to the pump inlet to thereby keep fuel flowing to the engine, and without breaking the capillary sealing effect across filters 176 and 160 due to system balancing of forces. When fuel is again available from the main body of fuel into the tank to again submerge main filter 176 the capillary seal effect will be broken across filter 176, thereby allowing fuel to pass through primary filter 176 and into chamber 186 to feed the pump inlet. This inflow also reduces the downwardly acting pressure differential on secondary filter diaphragm 160. Also, if diaphragm 160 is likewise re-immersed in tank fuel the capillary seal effect across filter 160 will also be broken. This allows spring 168 to force the filter 160 upwardly back to its normal position adjacent canister outlet seat 182. If rubber seal 161 is present on diaphragm 160 it will be reclosed on seat 182 by spring 168 to thus stop the flow of reserve fuel from reservoir 121 to the pump inlet 16.

If seal 161 is not present on filter 160, canister outlet 144 will still be closed, but not sealed, by the mesh filter material forced across seat 182. Hence a controlled but continuous flow of reserve fuel will occur from reservoir 121 through the center portion of permeable zone 161, through spring cup orifice 166 and through the spaces between the coil of spring 168 into main filter chamber 186. Thus when tank fuel level is below the top of the canister, the pump will draw from the reservoir and tank in an inverse ratio to maintain by the pressure balancing effect a reserve head of fuel in the canister.

As in the first embodiment of FIGS. 1 and 2, cup orifice 166 is calibrated (e.g., 0.40 mm diameter) to provide the aforementioned "balance" to maintain a maximum head of reserve fuel in canister 120 and a minimum overflow from canister during normal fuel delivery system operation. This assures that a sufficient quantity of reserve bypass fuel will be available for pump input draw when the pump inlet is starved of fuel from the main tank, while also maximizing return of twice filtered bypassed fuel during normal pump operation under non-starvation conditions.

In addition, at system shut-down, when the vehicle engine is turned off, and whenever a gravity head pressure differential exists due to the level of fuel in reservoir 120 being above that of the main body of fuel in the tank, the reserve fuel will drain from reservoir 121 through filter 160 and cup orifice 166 into the main filter chamber 186 and then out through primary filter 176 and secondary filter 160 into the tank. This reverse fuel flow through these filters will produce a backwash effect on both filters 160 and 176 tending to wash away tank contaminant particles clinging to the exterior surfaces of these filters. Therefore the rate at which these filters can become clogged over the operational life of the system is greatly reduced.

When diaphragm 160 is made imperforate in its central region 161 by the provision of the aforementioned rubber sealing material for engagement with canister valve seat 182, and/or by the provision of a imperforate spring cup 164 (orifice 166 not provided therein) system shut down gravity differential flow of reserve fuel via bottom outlet 144 can be substantially if not completely prevented by spring 168 closing the filter diaphragm valve structure. In this event the quantity of reserve fuel available for system start up can be preserved for greatly prolonged periods of shut down even under low main tank fuel level conditions.

Moreover, with either type of canister valve closing mode (i.e., with or without always-open canister fuel flow through outlet 144 and calibrated orifice 166), whenever the pump-induced fluid pressure differential acting between main filter chamber 186 and filter diaphragm 160 becomes operable to pull diaphragm 160 downwardly to unseat the same from outlet valve seat 182 (as when filter 176 and 160 are starved of main tank fuel) the resultant increased flow of fuel from outlet 144 onto the upper surface of diaphragm 160 (which can be at a much higher flow rate than that through orifice 166), as indicated by the arrows in FIG. 6, has a "fountain-washing" effect on the upper exterior surface of filter 160. This effect is enhanced by the cooperative geometry of filter diaphragm 160, i.e., being raised in the center by spring 168 and recessed downwardly therefrom in a conical formation out to the periphery of the filter at diaphragm retainer 162. This down-flow of fuel as it exits outlet 144 tends to radially spread out in a full circle pattern as it is initially flowing along the exterior surface of filter 160 radially outwardly of the central area 161, and as it is being drawn by the pressure differential through filter 160 into chamber 186. Hence this fountain flow tends to keep the exterior surface of filter 160 washed free of contaminant clogging, particularly in an annular zone immediately adjacent and surrounding central region 161. Secondary filter 160 therefore tends to remain unclogged by tank contaminants for a longer period than primary filter 176 because of this fountain washing effect, and also due to the disposition of secondary filter 160 at a higher elevation than primary filter 176, i.e., on the top side of base 130 versus the underside thereof. This system operational effect provides an enhanced fail-safe feature insofar as it provides an auxiliary fuel inflow path from the main tank body of fuel through secondary filter 160 in parallel with that through primary filter 176 to main filter chamber 186 and thence to pump inlet 16. Hence even when primary filter 176 is severely clogged with tank contaminants the fuel delivery system can remain operable for a prolonged period by drawing fuel from the main body of fuel in the tank through only secondary filter 160.

It is also possible with the system of the second embodiment of the invention to vary by empirical design the balance between the upward bias of spring 168 versus the forces generated by fluid pressure differential between canister fuel head versus that of the tank, and the forces generated by pump suction, so that there is a supplementary and variable canister outflow of reserve fuel passing through filter 160 into chamber 186 additive to the flow through cup orifice 166 and at a much greater flow rate. Such fuel draw from canister reservoir 121 thus can be designed to occur in parallel balance with, and concurrently with, pump fuel draw from the tank through filters 176 and 160 under non-starvation conditions.

It will be noted that the valve structure of filter diaphragm 160 is arranged to open in the direction of flow out of canister outlet 144 into main chamber 186, and likewise to open in the direction of flow from the main body of fuel tank through filter diaphragm 160 into chamber 186, and to merge toward the pump inlet 16, under both starvation and non-starvation conditions. Hence operation of pump 14 will tend to open canister outlet 144 under both conditions but with varying effect depending on which of these conditions are effective or controlling at any given time. Thus the variable flow rate control provided by the fixed calibrated orifice 166 can be modulated and augmented by the variable downwardly opening action of diaphragm 160. Thus orifice 161 and spring 168 can be designed to work together to better achieve canister bypass fuel head balancing conditions in order to match system operational and performance parameters in achieving the aforementioned maximization of return of bypass fuel to pump inlet during normal system operation under non-starvation conditions.

Indeed, even when orifice 166 is omitted and spring cup 164 made imperforate, and/or an imperforate rubber seal is provided in the central region 161 of filter diaphragm 160, this balancing of canister head level to minimize canister overflow and maximize return of canister bypass fuel to the pump can be obtained by design and selection by spring 168.

Thus spring 168 can be selected to exert a very light upwardly biasing force on filter diaphragm 160, i.e., only sufficient to maintain outlet 144 closed and sealed at system shut down when opening pressure differential across the valve is created only by gravity head differential between canister head and main tank head. This at most may only be 4 to 8 inches of fuel in canister 120 when the main tank is empty. When the fuel delivery system is operational with the vehicle engine running the increased pressure differential acting on diaphragm 160 in response to the effect of pump suction at inlet 16 will be additive to such gravity head generated pressure differential, and spring 168 can be designed to then yield in a downwardly valve opening direction under such conditions.

It is also possible to still obtain the filter backwash effect even with an imperforate valve member provided on or in association with filter diaphragm 160 and central region 161. Thus at system shut down spring 168 can be selected to allow leakage of bypass fuel from reservoir 121 from say completely full to half full whenever the main tank is empty or at some very low level condition. Although this backwashing effect may thus not occur very often during the service life of the vehicle and fuel delivery system, even creating the possibility of such an event occurring infrequently can enhance operational life of the fuel delivery system. Moreover, it is precisely at these very low tank fuel level conditions that filter clogging conditions become aggravated because contaminant concentration at the filters increases for a fixed quantity of contaminant particles in the fuel tank as the volume of the main fuel body in the tank decreases. Also for this reason maximizing use of twice-filtered fuel through the pump becomes more beneficial in proportion to the drop in main tank fuel level in preventing fuel injector clogging and/or downstream fuel line filter clogging.

Hence the second embodiment of the invention readily can be made operable, as in the system of the aforementioned U.S. Pat. No. 4,747,388 such that reserve fuel is drawn from the canister reservoir 121 only as and when needed to keep fuel flowing to the engine under main tank pump starvation conditions. Module 120 can thus provide a large reserve fuel capacity to ensure extended vehicle operation under tank empty conditions, or for restarting the vehicle when parked on incline with a low tank fuel level. On the other hand, when the aforementioned filter backwashing capability at system shut-down is provided, and hence canister 120 loses some volumetric capacity reserve duration by loss to backwash outflow, it still is possible to obtain both beneficial effects, albeit each to a lesser extent. Again, mounting pump 140 directly in the main body of the fuel of the tank, outside of canister 120, enhances pump cooling and isolates it from any hot fuel conditions which may occur within the canister reservoir.

Also, in accordance with another one of the aforementioned features of the invention, the second embodiment enables the use of a turbine vane type rotary pump with a built-in vapor purging system to be operable as intended and in an enhanced manner, while still providing all of the advantages of a large reserve supply of fuel selectable as needed from the associated canister reservoir. Again it will be seen that the outlet of vapor purge port passage 35 is only slightly above the elevation of the pump inlet 162, as well as being laterally adjacent the bottom region of the reservoir chamber 121 of canister 120. In addition at least once-filtered fuel exiting pump chamber 33 via purge port 35 is returned to the main filter chamber 186 via trough 150 and filter diaphragm 160. Hence this now twice-filtered additional bypass fuel is returned to the pump inlet instead of being wasted by uncontrolled outflow to the tank fuel body. This further consevation of bypass fuel use again becomes particularly beneficial under very low tank level and/or pump starvation vehicle operational conditions.

The spoked spring retainer disc 170, filter diaphragm valve 160 and spring 168 provide a simple and economical valve actuating mechanism for opening and closing flow of reserve fuel to pump 14. In one mode of operation of valve 160 no reserve fuel will be lost to the tank when not needed by pump 14. On the other hand, since the pressure head of fuel in canister 120 acts in the direction tending to unseat valve 160, spring 226 can be made inexpensively as a light spring exerting minimal biasing force to allow diaphragm valve 160 to augment orifice flow and/or provide filter backwash flow.

In addition, locating the pump vapor purge passageways outside the reservoir canister also removes this reserve fuel reverse leak path through the pump when it is shut down, thereby eliminating the need for a pump inlet back check valve or foot valve type canister containment structure otherwise required to prevent such canister leak down through the pump vapor purge passageway.

Base 130, due to its use of flat, circular geometry in its multiple components, as herein disclosed in the form of the engineering scale views of FIGS. 11–33, is readily and economically manufacturable with plastic injection molding processes and equipment from a suitable fuel-compatible plastic, such as Acetal (except for the filter screen material of filters 160 and 176). Preferably the filter screen material is 70 micron mesh nylon 6 square weave for primary filter 176, and 62 micron mesh nylon 6 square weave for secondary filter diaphragm 160. The telescopic stack-up array of components 160, 162, 168 and 170 upwardly into base flange 133, and similarly the telescopic insertion of main fuel filter components 172, 184 and 176 into base flange 184, provide economies in part and assembly costs as well as service costs. The snap-together assembly of the pump and canister components on base 130 also contribute to manufacturing cost reduction.

Third Embodiment

Figure 34:
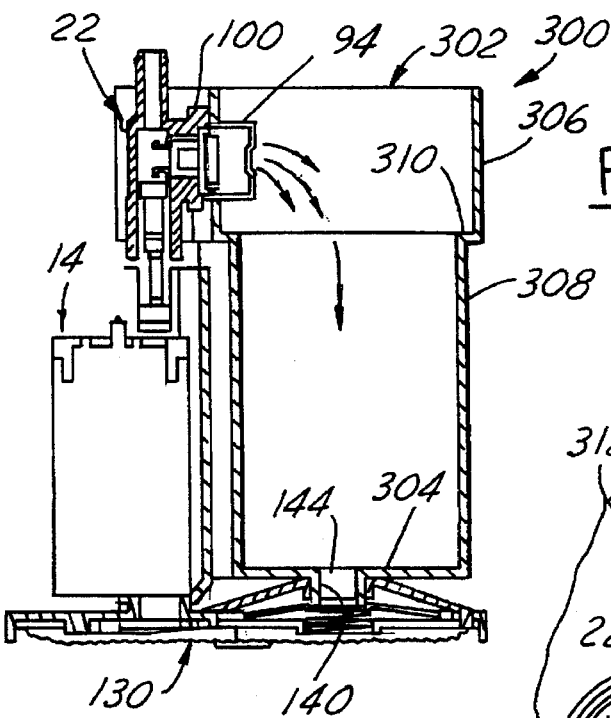
FIG. 34 is a simplified, part elevational and part center sectional view of a third embodiment fuel pump and reservoir canister module assembly of the invention utilizing the fuel pump and base subassembly of the second embodiment.
Figure 35:
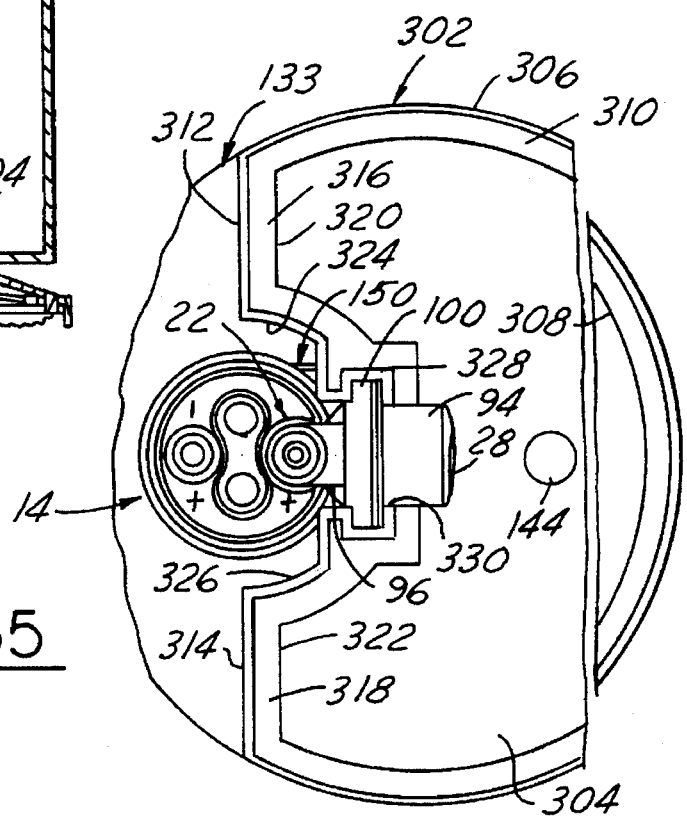
FIG. 35 is a top plan view of the assembly of FIG. 34, greatly enlarged thereover and with a portion of the base broken away.
Figure 38:
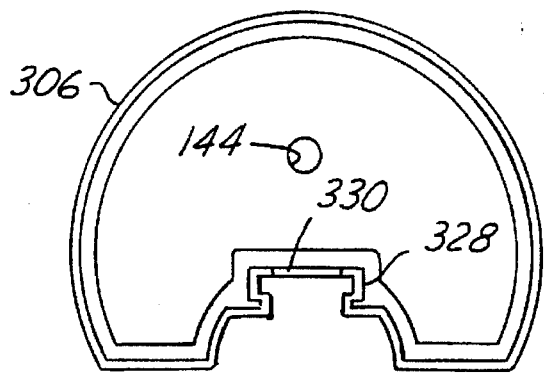
FIGS. 38 and 39 are top and bottom plan views respectively of the reservoir canister of FIGS. 34–37.
Figure 37:
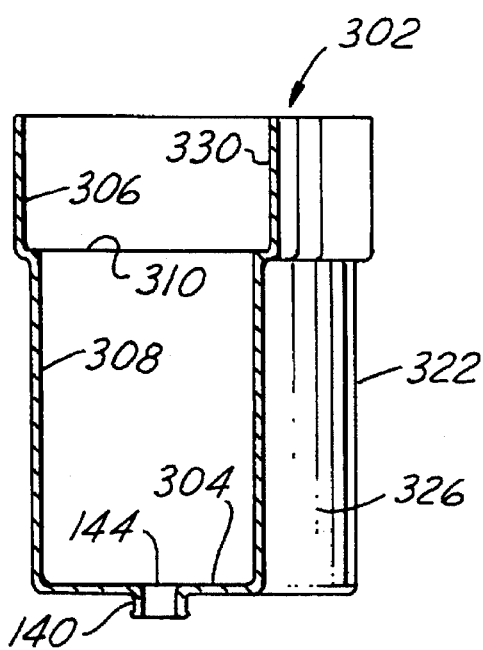
FIG. 37 is a cross-sectional view taken on the line 37—37 of FIG. 36.
Figure 36:
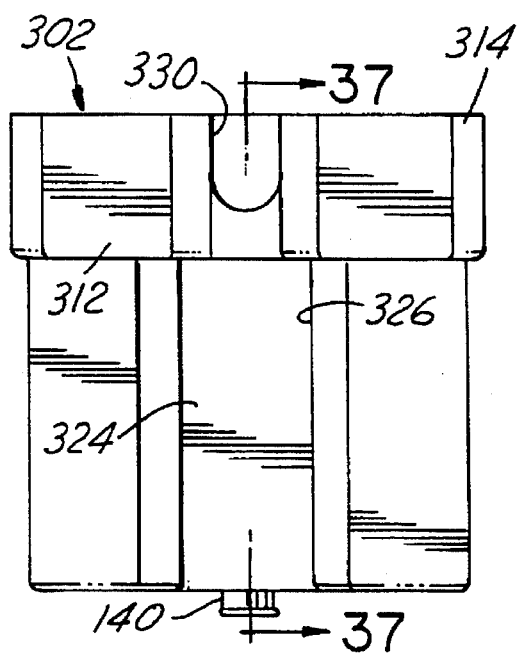
FIG. 36 is a side elevational view of the reservoir canister of the assembly of FIG. 34.
Figure 39:
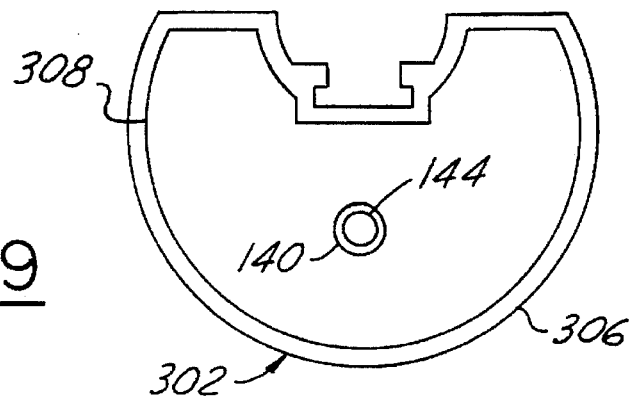

FIGS. 34–39 illustrate a third embodiment pump/canister/base module assembly 300 of the invention that utilizes the same pump assembly 14, bypass regulator subassembly 22 and base subassembly 130 as module assembly 110. However module assembly 300 uses a modified canister reservoir 302 constructed as shown to scale in FIGS. 34–39. Canister 302 has a generally "D-shape" in horizontal cross section, as best seen in FIGS. 35, 38 and 39. The bottom wall 304 of canister 302 is again provided with the neck outlet 140 to snap fit with mounting neck 136 of base spider 134 (FIG. 34). A major portion of the vertically oriented side wall of canister 302 is made up of cylindrically shaped upper and lower wall sections 306 and 308 integrally joined by a horizontal shelf wall section 310. The outside diameter of upper wall section 306 is made to the same as that of flange 133 so that the overall horizontal dimension of canister 302 does not increase the overall diameter of module assembly 300. Canister 302 is indented in its side wall formation in the area of pump 14 so that the pump has a recessed mounting relative to canister 302. For this purpose canister 302 has two upper chordal wall sections 312 and 314 joined by shelf wall sections 316 and 318 respectively to complemental lower chordal wall sections 320 and 322, wall sections 312 and 314 being generally coplanar with the axis of pump 14.

The canister side wall indentation adjacent pump 14 is formed by pocket walls 324 and 326 of concave curvature facing pump 14, and these are joined by a T-cross section wall section 328 (FIGS. 35, 38 and 39).

Pump 14 nests in the space between wall sections 324 and 326 and is mounted on base 130 in the same manner and location as in module assembly 110. However flange 100 of the bypass regulator 122 has a complemental downwardly sliding insertion fit into the T-section cavity of the T-wall 328, as best seen in FIG. 35. This sliding insertion T-lock interengagement between regulator flange 100 and canister wall T-section 328 provides the upper module support interconnection for the pump and canister. Their snap-in mounting on base 130 provides the lower module support interconnection. Wall T-section 328 is provided with an upwardly opening notch 330 for receiving the cylindrical portion 94 of pressure regulating housing 96. The regulator outlet 28 thus protrudes into the uppermost region of canister 302 with maximum spacing from the opposed face of upper wall section 306 and is generally vertically aligned above canister outlet 144.

It will thus be seen that canister 302 maximizes the space available above base 130 to thereby increase bypass reserve fuel capacity of module assembly 300. For example when base flange 133 has an outside diameter of 5 inches and canister 302 is constructed to the scale of FIGS. 34–39 relative to base 130, the canister may have a reservoir capacity of approximately 700 to 750 millimeters. By contrast, canister 120 when configured as shown in FIGS. 3–6 and constructed to the scale of FIGS. 7–10 relative to the same diameter base 133 has a capacity of approximately 300 millimeters. Thus although canister 302 is slightly more costly in terms of material and tooling costs than canister 120, the large increase in reserve capacity provides an economical cost/benefit ratio in many applications that still require a relatively small outside diameter module to fit within relatively small tank openings. In addition, all of the previously described features and advantages of module assembly 110 are still obtained with module assembly 300.

What is claimed is:

1. An in-tank fuel pump and reservoir canister module assembly comprising, an electric fuel pump having an inlet and an outlet and constructed to be mounted in a fuel tank, a primary fuel filter of a material having a plurality of openings through which fuel can flow from the tank to an interior main filter chamber having an outlet connected with the pump inlet for supplying fuel from the filter chamber to the pump inlet, said primary filter being constructed and arranged to be received immediately adjacent the bottom of the fuel tank, a fuel reservoir canister extending with its major dimension generally vertically in the tank and having adjacent its upper end an opening constructed to communicate canister overflow with the interior of the fuel tank, a closed lower end, and immediately adjacent the lower end a flow controlling outlet means for communicating the lower end of the reservoir canister with the interior of the filter chamber for the flow of fuel from the reservoir through the interior of the filter chamber to the inlet of the pump, said fuel pump being mounted in said module assembly outside of said reservoir canister adjacent thereto with its axis extending generally vertically and its inlet generally at the elevation of the lower end of said canister, and a bypass passageway connected with the outlet of the pump and the interior of the reservoir canister for bypassing some of the fuel from the outlet of the pump into the reservoir canister, whereby when the supply of fuel from the tank to the primary filter is momentarily interrupted reserve fuel from the reservoir canister will flow through said flow controlling means and the interior of the filter chamber and its outlet into the inlet of the fuel pump, said flow controlling means being constructed and arranged to cause a variable flow rate varying directly with the head differential between the level of bypass reserve fuel in said canister above the level of fuel in the tank so that bypass reserve fuel can be returned to the pump inlet whenever tank fuel level drops below reserve fuel level in the canister during operation of said fuel pump to thereby maximize reserve fuel head height in said canister and return of bypass fuel to the pump inlet while minimizing reserve fuel overflow to the tank.

2. The assembly of claim 1 wherein said flow controlling means comprises a restricted orifice.

3. The assembly of claim 1 wherein said canister has a bottom outlet opening and said flow controlling means comprises a secondary filter diaphragm communicating with the tank and main filter chamber and underlying said canister bottom outlet for filtering fuel flowing from said reservoir canister through said bottom outlet into the main filter chamber, and valve means operably associated with said secondary filter diaphragm and biased by a spring upwardly toward said canister bottom outlet, said valve means being movable between positions tending to open and close bypass reserve fuel flow from the canister bottom outlet into the main filter chamber in response to varying pressure differential acting downwardly on said diaphragm filter as such occurs between the tank and main filter chamber.

4. The assembly of claim 3 wherein said secondary filter diaphragm has a plurality of openings through which fuel flows with an average opening size not greater than about 62 microns.

5. The assembly of claim 4 wherein the openings of said primary filter have an average size not greater than about 70 microns.

6. The assembly of claim 3 wherein said valve means includes an always-open restricted orifice.

7. The assembly of claim 6 wherein said orifice comprises an opening in a spring cup bearing on and between said secondary filter diaphragm and the biasing spring.

8. The assembly of claim 3 including a support base subassembly having a mounting flange with said fuel pump and canister mounted upright on its upper side, and open at its bottom side, said primary filter comprising a sheet of plastic filter material spanning the open bottom side of said base flange and spaced therefrom to define the main filter chamber therebetween, and including a baffle received on the upper side said primary filter sheet and spacing the same from pump inlet.

9. The assembly of claim 8 wherein said secondary diaphragm filter is attached to said base flange above said primary filter sheet and is spaced therefrom to define a portion of the main filter chamber therebetween.

10. The assembly of claim 9 wherein said base flange also includes a perforate support stand disposed over said secondary filter diaphragm and on which said canister is supported, said canister bottom outlet communicating through said support stand with said valve means and defining a fixed valve seat engageable with said filter diaphragm when the latter is in closed position.

11. The assembly of claim 8 which also comprises a pressure regulator mounted between said pump and canister and operably connected to said bypass passageway for regulating and controlling the pressure of fuel supplied from the outlet of said pump to the exterior of the fuel tank for delivery to an engine when the pump is operating by varying and controlling the quantity of fuel flowing through the bypass passageway into the fuel reservoir canister.

12. The assembly of claim 11 wherein said module is constructed to fit at its lower end into the laterally narrow confines of a swirl pot basin at the bottom of the fuel tank, and wherein said reservoir canister and said pump are generally cylindrical and have their major dimensions constituting their central axes extending generally vertically in the fuel tank, said pressure regulator being top mounted on said pump and having its bypass discharge outlet projecting at least partially through a side wall of said canister and into the interior thereof, said primary filter comprising a disc sheet having its diameter oriented generally in a first plane perpendicular to a second plane defined by the axes of said canister and pump whereby the outside thickness dimension of said entire assembly perpendicular to said second plane is relatively narrow compared to the overall height and width dimensions of said module assembly.

13. The assembly of claim 1 wherein said reservoir canister has its lower end operably attached to an assembly support base attached to the primary filter and its upper end opening into the tank, said base communicating with the lower end of said canister and retaining the primary filter therebeneath, said flow controlling means comprising a restricted orifice disposed in and opening through said base to the interior of the main filter chamber, said primary filter including spacer baffle means disposed within said main filter chamber for preventing collapse of said primary filter upwardly toward said base.

14. A fuel delivery system for an engine comprising an in-tank fuel pump and reservoir canister module assembly operable for delivering fuel to the engine comprising, an electric fuel pump having an inlet and an outlet and constructed to be mounted in a fuel tank, a primary fuel filter defining with said assembly a filter chamber and constructed of a material having a plurality of openings through which fuel can flow from an exterior surface of said filter exposed to the main body of fuel in the tank to the interior surface side of the filter exposed to the filter chamber, the filter chamber having an outlet connected with the inlet of the pump for supplying fuel from the interior side of the filter to the pump inlet, said filter being constructed and arranged to be received immediately adjacent the bottom of the fuel tank, a fuel reservoir canister having its major dimension extending generally vertically in the tank and having adjacent its upper end an opening constructed to overflow communicate with the fuel tank, a closed lower end and adjacent said lower end a flow controlling canister outlet means for communicating the lower end of said canister reservoir with the interior of the filter chamber for the flow of reserve fuel from the lower end of the canister reservoir through the interior of the filter chamber to the inlet of the pump, said fuel pump comprising a rotary pump mounted in said assembly outside of said reservoir canister and exposed directly in the fuel tank, said pump having an internal vapor purge system including a purge passageway having an inlet end communicating with a pumping chamber of said rotary pump and an outlet end adapted to communicate directly with the interior of the fuel tank, said system also including a bypass passageway communicating with the outlet of the pump and the interior of the reservoir canister for bypassing into the canister reservoir that quantity of the fuel delivered via the outlet of the pump and not taken by engine demand, whereby when the supply of fuel from the tank to the primary filter is interrupted bypassed reserve fuel in the canister reservoir will flow through said flow controlling means, the interior of filter chamber and via its outlet into the inlet of the fuel pump, and further including a secondary filter disposed at higher elevation than said primary filter and also being constructed of a material having a plurality of openings through which fuel can flow from an exterior surface thereof exposed to the tank to an interior surface thereof communicating with the filter chamber, said flow controlling means comprising a valve for controlling a bottom outlet of the reservoir canister and operable to admit fuel to the inlet of said pump via the filter chamber, and means to open said valve in response to absence of liquid fuel at the exterior surfaces of said primary and secondary filters.

15. The system of claim 14 wherein said secondary filter is constructed and arranged to operate as a diaphragm and to function as said means to open said valve, said primary and secondary filter openings being constructed to be closed by capillary action of a liquid fuel present in the tank to resist passing of air or water from the exterior surfaces of said filters into the filter chamber.

16. The system of claim 15 wherein said canister closed lower end comprises a bottom wall and said canister bottom outlet comprises a neck opening below which said valve is positioned and wherein a valve seat on said canister outlet neck cooperates with said valve to open and close communication between the bottom of the reservoir of said canister and the filter chamber.

17. The system of claim 16 in which said primary filter comprises a fuel filter sheet permeably closing the bottom of the filter chamber below said pump inlet and below said canister bottom outlet.

18. The system of claim 17 wherein said valve has a valve opening and closing member movable in the space below said valve seat and said valve is biased in a direction downwardly away from said valve seat by the gravity head of reserve fuel in the canister reservoir.

19. The system of claim 18 further including spring means disposed in the filter chamber for biasing the valve to a closed position against said valve seat and operably connected with said secondary filter diaphragm such that movement of said secondary filter diaphragm downwardly when closed by the aforesaid capillary action of wetting by liquid fuel and presence of air and/or water at the exterior side of said secondary filter diaphragm in response to pump suction exerted on the interior of the filter chamber overcomes the bias of said spring means and opens said valve to thereby emit fuel from the bottom of the canister reservoir to the pump inlet via the filter chamber.

20. The system of claim 19 wherein said flow controlling means further includes an annular perforate rigid spring retainer disc fixedly disposed in the filter chamber and centered below the interior surface of said secondary filter, wherein said valve comprises a central area of the secondary filter material movably responsive to flexing movement of said secondary diaphragm filter, and wherein said spring means comprises a coil spring disposed between said central area of said secondary filter diaphragm and a central hub of said disc for yieldably biasing said valve toward said seat.

21. A fuel delivery, system for an engine comprising an in-tank fuel pump and reservoir canister module assembly operable for delivering fuel to the engine comprising, an electric fuel pump having an inlet and an outlet and constructed to be mounted in a fuel tank, a primary fuel filter defining with said assembly a filter chamber and constructed of a material having a plurality of openings through which fuel can flow from an exterior surface of said filter exposed to the main body of fuel in the tank to the interior surface side of the filter exposed to the filter chamber, the filter chamber having an outlet connected with the inlet of the pump for supplying fuel from the interior side of the filter to the pump inlet, said filter being constructed and arranged to be received immediately adjacent the bottom of the fuel tank, a fuel reservoir canister having its major dimension extending generally vertically in the tank and having adjacent its upper end an opening constructed to overflow communicate with the fuel tank, a closed lower end and adjacent said lower end a flow controlling canister outlet means for communicating the lower end of said canister reservoir with the interior of the filter chamber for the flow of reserve fuel from the lower end of the canister reservoir through the interior of the filter chamber to the inlet of the pump, said fuel pump comprising a rotary pump mounted in said assembly outside of said reservoir canister and exposed directly in the fuel tank, said pump having an internal vapor purge system including a purge passageway having an inlet end communicating with a pumping chamber of said rotary pump and an outlet end adapted to communicate directly with the interior of the fuel tank, said system also including a bypass passageway communicating with the outlet of the pump and the interior of the reservoir canister for bypassing into the canister reservoir that quantity of the fuel delivered via the outlet of the pump and not taken by engine demand, whereby when the supply of fuel from the tank to the primary filter is interrupted bypassed reserve fuel in the canister reservoir will flow through said flow controlling means, the interior of filter chamber and via its outlet into the inlet of the fuel pump, and further including a secondary filter disposed at higher elevation than said primary filter and also being constructed of a material having a plurality of openings through which fuel can flow from an exterior surface thereof exposed to the tank to an interior surface thereof communicating with the filter chamber, and wherein said module assembly has an overall outside lateral dimension adapted for insertion through a mounting opening in the top wall of the tank, said canister comprising an open top shell container having indented sidewall portions nestably receiving said pump exteriorly thereof, and a base subassembly on which the bottom of said canister container with its bottom outlet is mounted and the bottom of the pump with its fuel inlet is likewise mounted, said base subassembly containing said primary filter, said secondary filter, said flow controlling means and the filter chamber.

22. The system of claim 14 wherein said pump comprises a turbine type rotary vane pump.

23. The system of claim 15 wherein said pump comprises a turbine type rotary vane pump.

24. The system of claim 16 wherein said pump comprises a turbine type rotary vane pump.

25. The system of claim 17 wherein said pump comprises a turbine type rotary vane pump.

26. The system of claim 18 wherein said pump comprises a turbine type rotary vane pump.

27. The system of claim 19 wherein said pump comprises a turbine type rotary vane pump.

28. The system of claim 20 wherein said pump comprises a turbine type rotary vane pump.

29. The system of claim 21 wherein said pump comprises a turbine type rotary vane pump.

30. The system of claim 20 wherein said primary filter further comprises a circular sheet of filter material having an outer peripheral edge portion and a primary filter retainer ring having the outer edge portion of said primary filter sheet affixed thereto, said module assembly including a base subassembly having a flange with an opening therethrough in which said pump inlet is mounted, said base flange laterally encompassing therebelow said canister bottom wall and said pump and having an upwardly protruding perforate canister mounting boss below said valve seat, said base flange also having a flow passageway therethrough communicating with said valve and said valve seat, said canister bottom wall neck protruding downwardly from the lower end of the canister reservoir and being received in said base flange mounting boss for connecting said base flange to said canister, said base flange having an annular peripheral wall for receiving and mounting said primary filter retainer ring thereto to thereby suspend said primary filter sheet therebelow and thereby define the main filter chamber therebetween.

31. A fuel delivery system for an engine comprising an in-tank fuel pump and reservoir canister module assembly operable for delivering fuel to the engine comprising, an electric fuel pump having an inlet and an outlet and constructed to be mounted in a fuel tank, a primary fuel filter defining with said assembly a filter chamber and constructed of a material having a plurality of openings through which fuel can flow from an exterior surface of said filter exposed to the main body of fuel in the tank to the interior surface side of the filter exposed to the filter chamber, the filter chamber having an outlet connected with the inlet of the pump for supplying fuel from the interior side of the filter to the pump inlet, said filter being constructed and arranged to be received immediately adjacent the bottom of the fuel tank, a fuel reservoir canister having its major dimension extending generally vertically in the tank and having adjacent its upper end an opening constructed to overflow communicate with the fuel tank, a closed lower end and adjacent said lower end a flow controlling canister outlet means for communicating the lower end of said canister reservoir with the interior of the filter chamber for the flow of reserve fuel from the lower end of the canister reservoir through the interior of the filter chamber to the inlet of the pump, said fuel pump comprising a rotary pump mounted in said assembly outside of said reservoir canister and exposed directly in the fuel tank, said pump having an internal vapor purge system including a purge passageway having an inlet end communicating with a pumping chamber of said rotary pump and an outlet end adapted to communicate directly with the interior of the fuel tank, said system also including a bypass passageway communicating with the outlet of the pump and the interior of the reservoir canister for bypassing into the canister reservoir that quantity of the fuel delivered via the outlet of the pump and not taken by engine demand, whereby when the supply of fuel from the tank to the primary filter is interrupted the bypassed reserve fuel in the canister reservoir will flow through said flow controlling means, the interior of the filter chamber and via its outlet into the inlet of the fuel pump, and further including a secondary filter disposed at higher elevation than said primary filter and also being constructed of a material having a plurality of openings through which fuel can flow from an exterior surface thereof exposed to the tank to an interior surface thereof communicating with the filter chamber, and wherein the exterior surface of said secondary filter is constructed and arranged relative to the outlet end of said pump purge passageway to receive pump fuel expelled from the outlet end of the pump vapor purge passageway and thereby flow communicate such pump expelled purge fuel into the filter chamber via said secondary filter.

32. A method of delivering fuel to an engine comprising the steps of:

(1) providing an electric fuel pump having an inlet and an outlet mounted in a fuel tank, a primary fuel filter of a material having a plurality of openings through which fuel can flow from the tank to a filter chamber having an outlet connected with the pump inlet for supplying fuel from the filter chamber to the pump inlet, the primary filter being arranged immediately adjacent the bottom of the fuel tank, a fuel reservoir canister in the tank having adjacent its upper end an opening for canister overflow to tank interior, a flow controlling outlet for communicating the lower end of the canister with the interior of the filter chamber for the flow of fuel from the reservoir through the interior of the filter chamber to the inlet of the pump, and a bypass passageway connected with the outlet of the pump and the interior of the reservoir canister for bypassing fuel in excess of engine demand from the outlet of the pump into the reservoir canister, (2) causing a flow of reserve fuel from the reservoir canister through the flow controlling outlet and the interior of the filter chamber into the inlet of the fuel pump, and (3) controlling such flow of reserve fuel at a variable flow rate varying directly with the head differential between the level of bypass reserve fuel in the canister above that of fuel in the tank such that bypass reserve fuel is returned to the pump inlet whenever tank fuel level drops below reserve fuel level in the canister during operation of the fuel pump to thereby maximize reserve fuel head height in the canister and return of bypass fuel to the pump inlet while minimizing reserve fuel overflow to the tank.

33. The method of claim 32 wherein the step of controlling reserve fuel flow is performed with a restricted orifice.

34. The method of claim 32 wherein the step of controlling reserve fuel flow is performed by providing a filter diaphragm communicating with the tank and filter chamber and filtering fuel flowing from the reservoir canister into the filter chamber, and by providing a valve operably associated with the secondary filter diaphragm and yieldably biased upwardly toward said canister bottom outlet, and wherein the valve is caused to move between positions tending to open and close bypass reserve fuel flow from the canister into the filter chamber in response to varying pressure differential acting on the diaphragm filter as such occurs between the tank and filter chamber.

35. The method of claim 34 wherein the valve includes a restricted orifice arranged to be open in both open and closed positions of the valve and calibrated for assisting the valve in performing the step of controlling reserve fuel flow.

36. The method of claim 32 comprising the further step of providing a pressure regulator operably connected to the bypass passageway for regulating and controlling the pressure of fuel supplied from the outlet of the pump to the exterior of the fuel tank for delivery to an engine when the pump is operating by varying and controlling the quantity of fuel flowing through the bypass passageway into the fuel reservoir canister.

37. The method of claim 32 wherein the step of controlling flow of reserve fuel further comprises providing a valve for controlling a bottom outlet of the reservoir canister and operable to admit fuel to the inlet of the pump via the filter chamber, and causing the valve to open in response to absence of liquid fuel at the exterior surface of the primary filter.

38. The method of claim 37 wherein the step of causing the valve to open is performed by providing a secondary filter constructed and arranged to operate as a diaphragm and to function to open the valve when closed by capillary action of a liquid fuel present in the tank resisting passing of air or water from the exterior of both primary and secondary filters into the filter chamber.

39. The method of claim 38 further including the step of providing a spring disposed in the filter chamber for biasing the valve to a position closing reserve fuel flow from the canister and operably connected with the secondary filter diaphragm to resiliently yield to secondary filter diaphragm movement when closed by the aforesaid capillary action of wetting by liquid fuel and presence of air and/or water at the exterior tank side of the secondary filter diaphragm in response to pump suction exerted on the interior of the filter chamber overcomming the bias of the spring and opening the valve to thereby emit fuel from the canister reservoir to the pump inlet via the filter chamber.

* * * * *